US012604190B2

(12) United States Patent
Mohebbi

(10) Patent No.: US 12,604,190 B2
(45) Date of Patent: Apr. 14, 2026

(54) TECHNIQUES FOR ENABLING COMMUNICATION BETWEEN A PLURALITY OF DISPARATE NETWORKS AND DEVICES UTIILZING VARIOUS CONNECTION TECHNOLOGIES

(71) Applicant: Meta Platforms, Inc., Menlo Park, CA (US)

(72) Inventor: Behzad Barjasteh Mohebbi, San Diego, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 406 days.

(21) Appl. No.: 17/872,906

(22) Filed: Jul. 25, 2022

(65) Prior Publication Data

US 2024/0031811 A1     Jan. 25, 2024

(51) Int. Cl.
*H04W 12/088* (2021.01)
*H04W 12/72* (2021.01)

(52) U.S. Cl.
CPC ......... *H04W 12/088* (2021.01); *H04W 12/72* (2021.01)

(58) Field of Classification Search
CPC ........................... H04W 12/088; H04W 12/72
See application file for complete search history.

(56) References Cited

U.S. PATENT DOCUMENTS

| | | | | |
|---|---|---|---|---|
| 9,357,386 | B2 * | 5/2016 | McCann | H04L 61/5076 |
| 9,455,959 | B1 * | 9/2016 | Garg | H04L 63/0281 |
| 10,382,933 | B2 * | 8/2019 | Pawar | H04L 65/1069 |
| 11,115,501 | B2 * | 9/2021 | Salmela | H04W 12/04 |
| 11,240,660 | B2 * | 2/2022 | Hu | H04W 12/04 |
| 11,392,927 | B2 * | 7/2022 | Maus | G06Q 20/30 |
| 11,711,693 | B2 * | 7/2023 | Bernsen | H04W 4/80 455/410 |
| 11,722,891 | B2 * | 8/2023 | Nair | H04W 12/40 726/3 |
| 12,047,375 | B2 * | 7/2024 | Williams | H04L 63/1491 |
| 12,361,455 | B2 * | 7/2025 | Zavesky | G06Q 30/0282 |

(Continued)

OTHER PUBLICATIONS

Khan R., et al., "A Survey on Security and Privacy of 5G Technologies: Potential Solutions, Recent Advancements and Future Directions," IEEE Communications Surveys & Tutorials, Jul. 2019, vol. 22 (1), pp. 196-248.

(Continued)

*Primary Examiner* — Viral S Lakhia
(74) *Attorney, Agent, or Firm* — EVERSHEDS SUTHERLAND (US) LLP

(57) ABSTRACT

According to examples, a system for enabling communication between one or more disparate networks and network devices utilizing various connection technologies. The system may include a processor and a memory storing instructions. The processor, when executing the instructions, may cause the system to modify a security gateway to provide a metaverse security gateway by implementing a protocol associated with a 3rd Generation Partnership Project (3GPP) standard, modify a server to provide a metaverse server by implementing a protocol associated with the 3rd Generation Partnership Project (3GPP) standard, and utilize the metaverse security gateway and the metaverse server to facilitate a metaverse communication for a client device.

18 Claims, 20 Drawing Sheets

50

(56) References Cited

U.S. PATENT DOCUMENTS

| | | | | |
|---|---|---|---|---|
| 2007/0256120 | A1* | 11/2007 | Shatzkamer | H04L 63/0892 |
| | | | | 726/5 |
| 2018/0167383 | A1* | 6/2018 | Mandyam | H04L 63/08 |
| 2019/0141015 | A1* | 5/2019 | Nellen | H04L 63/0272 |
| 2020/0068391 | A1 | 2/2020 | Liu et al. | |
| 2020/0120087 | A1* | 4/2020 | Sreenivas | H04L 63/0492 |
| 2020/0280435 | A1 | 9/2020 | Lehtovirta et al. | |
| 2020/0336484 | A1* | 10/2020 | Mahajan | H04L 63/0884 |
| 2021/0058391 | A1* | 2/2021 | Graybeal | H04W 12/086 |
| 2021/0185532 | A1* | 6/2021 | Salkintzis | H04W 12/06 |
| 2022/0225093 | A1* | 7/2022 | Sasi | H04W 12/06 |
| 2022/0357936 | A1* | 11/2022 | Duggal | G06F 8/60 |
| 2023/0028642 | A1* | 1/2023 | Li | H04L 63/0823 |
| 2023/0044527 | A1* | 2/2023 | Sangameshwara | |
| | | | | H04L 65/1016 |
| 2023/0421448 | A1* | 12/2023 | Cui | H04L 41/12 |
| 2024/0004975 | A1* | 1/2024 | Bivens | G06F 21/316 |
| 2024/0005011 | A1* | 1/2024 | Dhawan | G06F 21/604 |
| 2024/0073223 | A1* | 2/2024 | Weizman | H04L 12/4675 |
| 2024/0414536 | A1* | 12/2024 | Yang | H04L 9/3247 |

OTHER PUBLICATIONS

Lemes M.T., et al., "A Tutorial on Trusted and Untrusted non-3GPP Accesses in 5G Systems—First Steps Towards a Unified Communications Infrastructure," arXiv:2109.08976v2 [cs.NI], Sep. 27, 2021, 22 pages.

* cited by examiner

3000

TECHNIQUES FOR ENABLING COMMUNICATION BETWEEN A PLURALITY OF DISPARATE NETWORKS AND DEVICES UTIILZING VARIOUS CONNECTION TECHNOLOGIES

TECHNICAL FIELD

This patent application relates generally to data communication and transfer, and more specifically, to systems and methods for enable communication between one or more disparate networks and network devices utilizing various connection technologies.

BACKGROUND

A developing technology likely to have a revolutionary impact on humanity is the metaverse. Although the metaverse may be defined in a myriad of ways, in some examples and as used herein, the metaverse may represent a single, universal, and/or immersive virtual environment. In some examples, the metaverse may be facilitated by the use of virtual reality (VR), augmented reality (AR), mixed reality (MR), and extended reality (XR), among other things.

In some examples, metaverse security may require, among other things, protection across any all platforms or networks, for any and all devices, and over any and all access technologies. That is, in an ideal circumstance, a device may be able to seamlessly connect to any device that may be necessary to facilitate a metaverse experience for a user. However, unfortunately, current cybersecurity schemes may not meet the challenges that may be presented by implementation of the metaverse.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figures 1A, 1B:
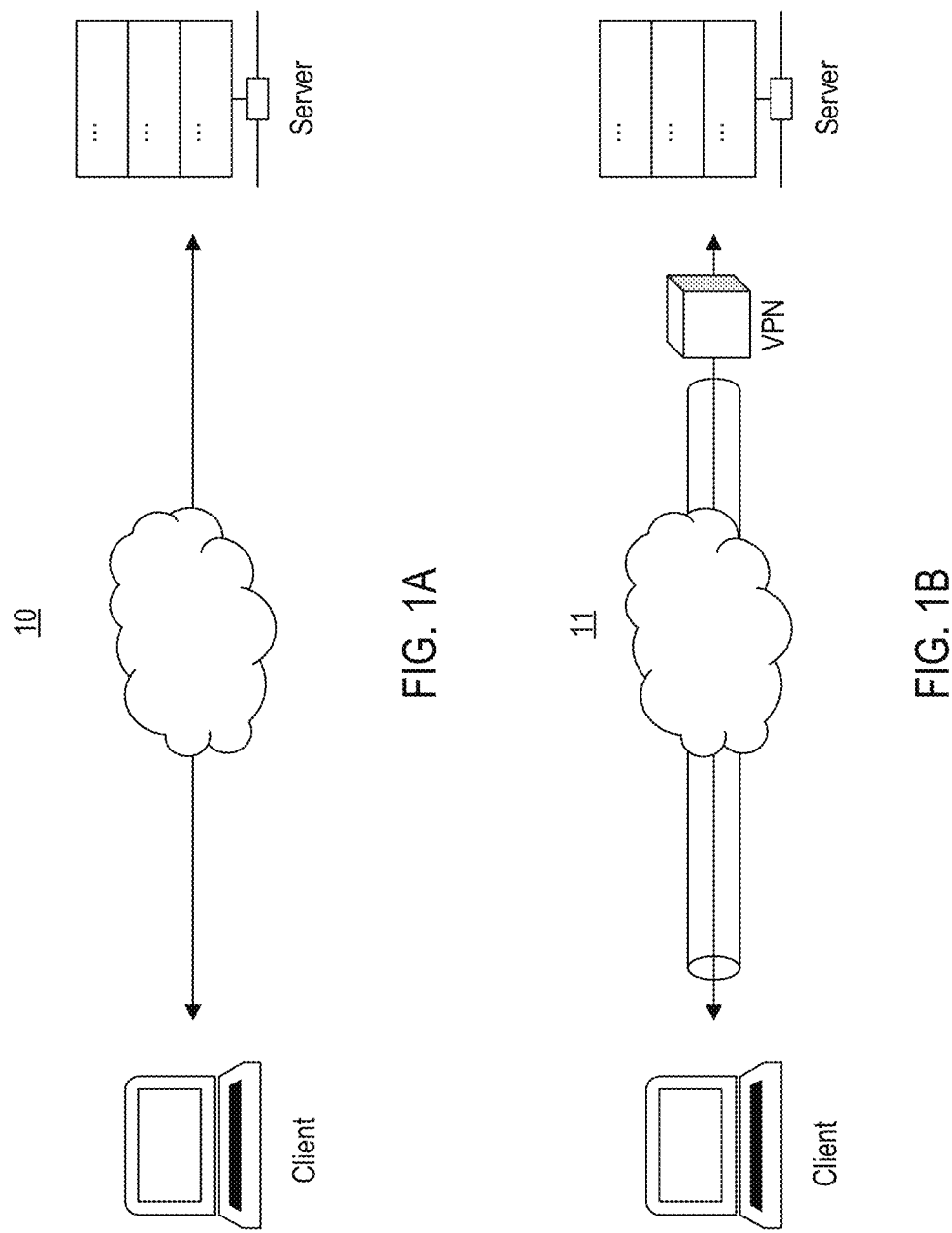
FIGS. 1A-1B illustrates a plurality of configurations of Internet Protocol (IP) network cybersecurity between a client device and a server, according to examples.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

A developing technology likely to have a revolutionary impact on humanity is the metaverse. Although the metaverse may be defined in a myriad of ways, in some examples and as used herein, the metaverse may represent a single, universal, and/or immersive virtual environment. In some examples, the metaverse may be facilitated by the use of virtual reality (VR), augmented reality (AR), mixed reality (MR), and extended reality (XR), among other things. In some examples, a metaverse application may be facilitated via a server located on an edge of a public or private cloud (i.e. an "edge server"). Also, in some examples, a metaverse application may be facilitated via a server located behind a cellular core network (e.g., a 5G core (5GC) network). In some instances, these diverse manners of facilitating metaverse applications may make it difficult to implement a single, unified approach to metaverse security.

In some examples, an ideal implementation of metaverse security may include implementation of a "zero-trust" policy, wherein communication between network elements may take place without trust given to or required of any entity (e.g., a human user). Moreover, metaverse security may also require, among other things, protection across any all platforms or networks, for any and all devices, and over any and all access technologies. However, unfortunately, current cybersecurity schemes may not meet the challenges that may be presented by implementation of the metaverse.

For the metaverse to reach its potential, the metaverse may be required to address a number of current and future realities, requirements, and features. So, for example, implementation of the metaverse may require accommodation of variety of devices and platforms. It may be appreciated that these devices may have different sizes/form factors and capabilities, and the platforms may have different security features and protocols. Furthermore, implementation of the metaverse may also be required to accommodate public and private networks, and also offer secure and seamless roaming capabilities between these networks as well.

Furthermore, implementation of the metaverse may be required to facilitate various present and future technologies as well. For example, implementation of the metaverse may require support of "local-breakout." As used herein, "local-breakout" may refer to providing of an internet access point that may be as close to a client device as possible. In addition, implementation of the metaverse may require support of device-to-device (D2D) communications, which may enable bypass of core infrastructure(s), thereby reducing network traffic and associated costs. Also, in some examples, implementation of the metaverse may require support of multipath-IP. As used herein, "multi-path IP" may refer to providing several IP paths concurrently (e.g., for the purpose of increasing throughput). In some examples, multipath-IP may implement protocols that may enable multiple concurrent secure data paths utilizing a (same) set of security credentials. Implementation of the metaverse may require accommodation of such technologies without compromising security. In addition, as it pertains to "fixed" core networks and "mobile" core networks, it may be beneficial to unify operations aspects (e.g., security credentials, protocols, etc.), and to provide a fixed-mobile "convergence."

In some examples, implementation of the metaverse may require support of a variety of access and connectivity technologies. One such example may include the internet. Currently, the internet may be supported by several access technologies, including wired and wireless network technologies. Examples of wireless network access technologies include such as Wi-Fi, cellular, and satellite. Furthermore, new access and connectivity technologies may emerge in the future as well.

In some examples, internet security is designed to enable any client to connect to a server, including a client and server that may have never met before. To facilitate this communication, in some examples, the internet may implement the transport layer security (TLS) 1.3 protocol. However, it should be noted that, in some examples, the security implemented by the transport layer security (TLS) 1.3 protocol may not account for security of "hops" that may be in-between the client and the server. That is, in some examples, the transport layer security (TLS) 1.3 protocol may not account for any security breaches that may be present in between.

FIGS. 1A-1B illustrates a plurality of configurations 10, 11 of Internet Protocol (IP) network cybersecurity between a client device and a server (e.g., a core network server), according to examples. In FIG. 1A, in some examples, a configuration 10 may facilitate communication between a first network entity (e.g., a client device) and a second network entity (e.g., a core network server) may take place via secure socket layer (SSL) and/or transport layer security (TLS) protocol(s). In FIG. 1B, in some examples (and as discussed further below), a configuration 11 may facilitate communication between a first network entity (e.g., a client device) and a second network entity (e.g., a core network server) may take place via implementation of a virtual private network (VPN).

In parallel with the growth of the internet, increase in digital communication has been facilitated by the growth of cellular networks. In recent years, cellular communication has largely been facilitated via fourth generation (4G or LTE) and fifth generation (5G) cellular networks. In some examples, 4G networks may have certain identified vulnerabilities (lack of user-plan integrity protection, fake base stations, etc.). In some examples 5G networks may provide additional security and protection by enabling protection for every "hop" in between a client and a network element and implementing a multi-layer trust model.

Figures 2A, 2B:
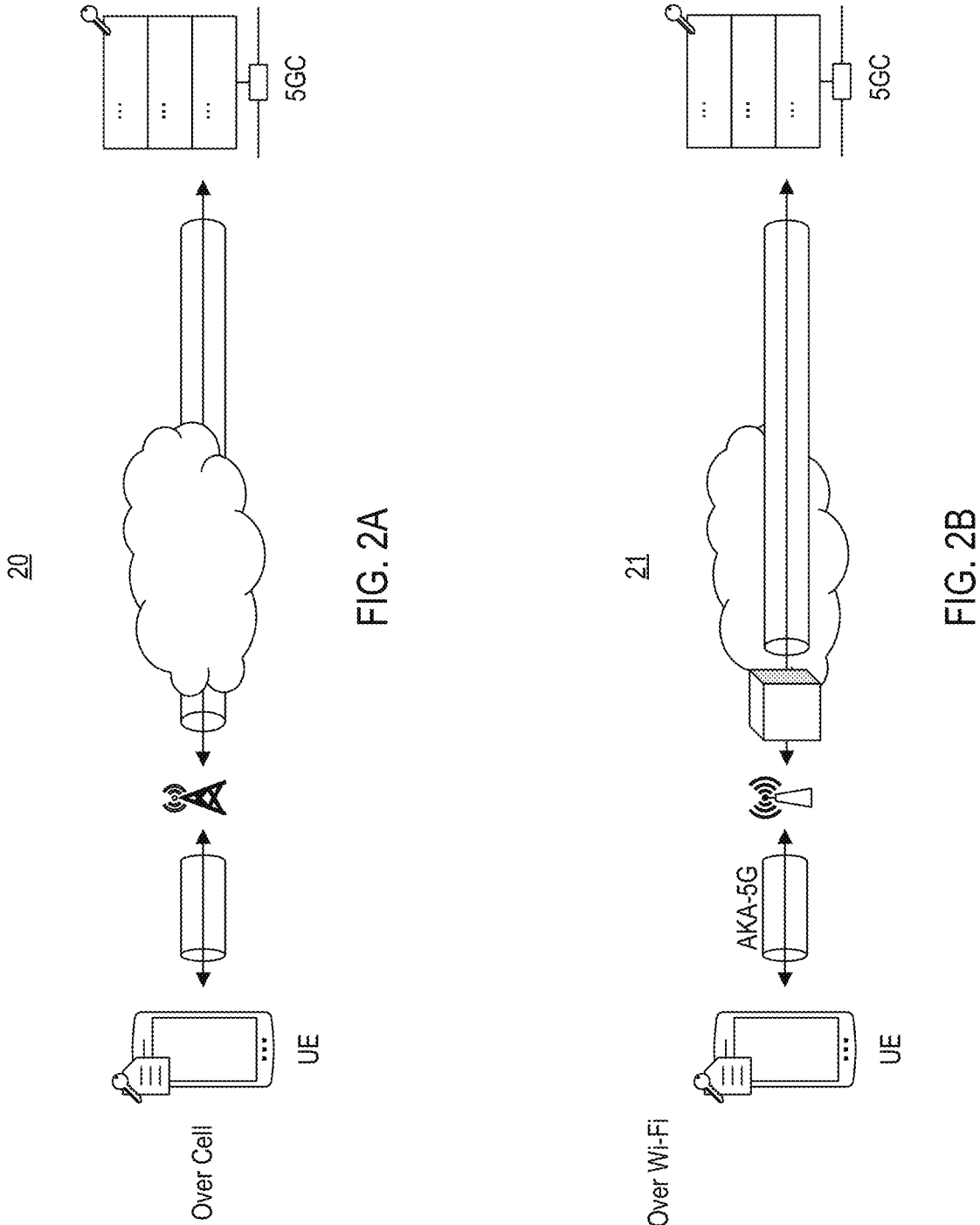
FIGS. 2A-2B illustrate a plurality of configurations of 5G Core network cybersecurity between a client device and a server, according to examples.

FIGS. 2A-2B illustrate a plurality of configurations 20, 21 of 5G Core network cybersecurity between a client device and a server (e.g., a core network server), according to examples. In FIG. 2A, in some examples, a configuration 20 may facilitate communication between a first network entity (e.g., a client device) and a second network entity (e.g., a core network server) may take place over a cellular connection, which may require implementation an authentication procedure (e.g., 5G-AKA). In FIG. 2B, in some examples, a configuration 21 may facilitate communication between a first network entity (e.g., a client device) and a second network entity (e.g., a core network server) may take place over a Wi-Fi connection (i.e., a Wi-Fi network).

In some examples, protection of network elements may be accomplished by placing critical infrastructure behind a security gateway. As used herein, a "security gateway" may be a network element that may provide predetermined access and security to some or all of a network. It may be appreciated that a security gateway may be implemented via hardware, software, or any combination thereof. An example of a security gateway may be a virtual private network (VPN).

Implementation of a security gateway may provide various benefits, including admission control, protection for backend infrastructure, and authentication of all network elements (e.g., devices, servers, etc.). In addition, implementation of a security gateway may provide secure (e.g., encrypted) link to all network elements (e.g., devices, servers, etc.), separation of security anchor and mobility function, provide both security as well as privacy for all users, and reduce the attack surface for both user and control plane.

Figure 3:
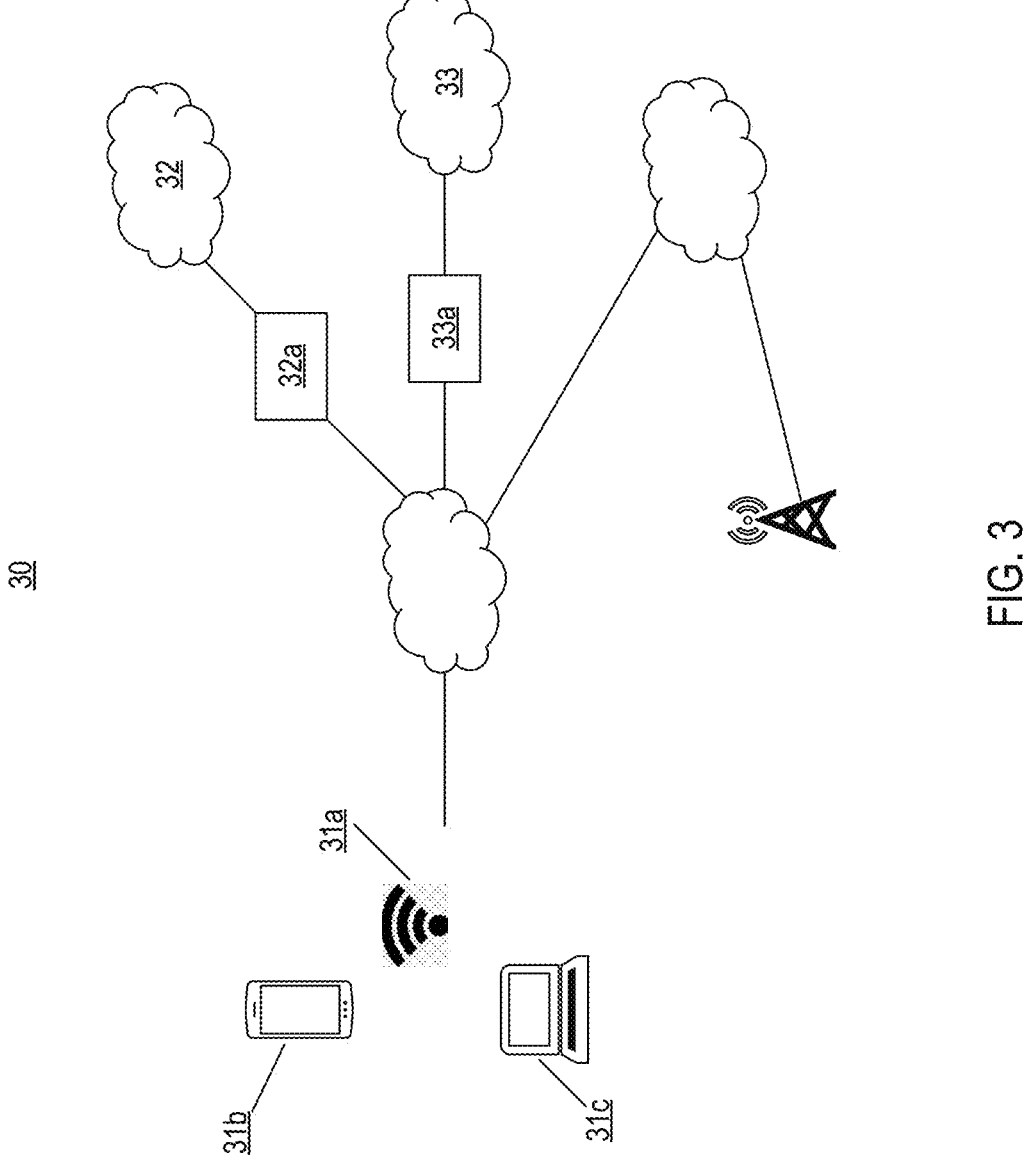
FIG. 3 illustrates a plurality of network elements of a communication network implementing a plurality of security gateways, according to an example.

FIG. 3 illustrates a plurality of network elements of a communication network 30 implementing a plurality of security gateways, according to an example. In some examples, the security gateways 32a, 33a may provide user devices and access networks 31a-31c access to networks 32, 33. It may be appreciated that each of the security gateways 32a, 33a may implement a specific (e.g., unique) set of security credentials and associated protocols.

In the current cybersecurity landscape, there may be a number of cybersecurity solutions (i.e., credentials, authentication processes, protocols, encryption, etc.) that may enable storage of credentials on device and server side. It may be appreciated that a security gateway may implement a unique configuration of one or more of the following solutions.

A first security solution implemented in the present cybersecurity landscape may be universal subscriber identity module (USIM). In some examples, universal subscriber identity module (USIM) may be used for authentication and encryption.

Another solution implemented in the present cybersecurity landscape may be a Fast IDentity Online (FIDO) standards, such as "FIDO-2." As used herein, a Fast IDentity Online (FIDO) standard may include any standard defined by the Fast IDentity Online (FIDO) Alliance. In some instances, Fast IDentity Online (FIDO) may be utilized to provide a secure environment for keeping security creden- tials. In some examples, Fast IDentity Online (FIDO) may be used for two-factor Authentication and password-less access. Also, in some examples, Fast IDentity Online (FIDO) may implement mutual authentication (i.e., via token bonding), and may implement authentication on a per-application/browser basis.

Another solution implemented in the current cybersecu- rity landscape may be certificates. In some examples, cer- tificates may be used for authentication and key agreement. In some examples, authentication via certificates may be non-mutual, and may take place on a per-connection basis.

Yet another solution implemented in the current cyberse- curity landscape may be passwords. In some examples, a password may be implemented to enable authentication. In some examples, this authentication may not be a mutual authentication, and in some cases may offer security that may only be proportional to a complexity of the password.

Accordingly, it may be appreciated that these security options for storing credentials, along with particularized implementation of these options, may lead to numerous security gateway permutations (i.e., configurations). Accom- modation of these numerous security gateway permutations may impede growth of the metaverse. Moreover, accommo- dation of these numerous security gateway permutations may open many attack surfaces in a complex metaverse environment.

In recent years, the 3rd Generation Partnership Project (3GPP) has created standardized protocols for mobile tele- communications. Examples of the types of technologies for which these protocols may be developed include Global System for Mobile Communications (GSM), Universal Mobile Telecommunications System (UMTS), 4G, and 5G technologies.

Figures 4A, 4B:
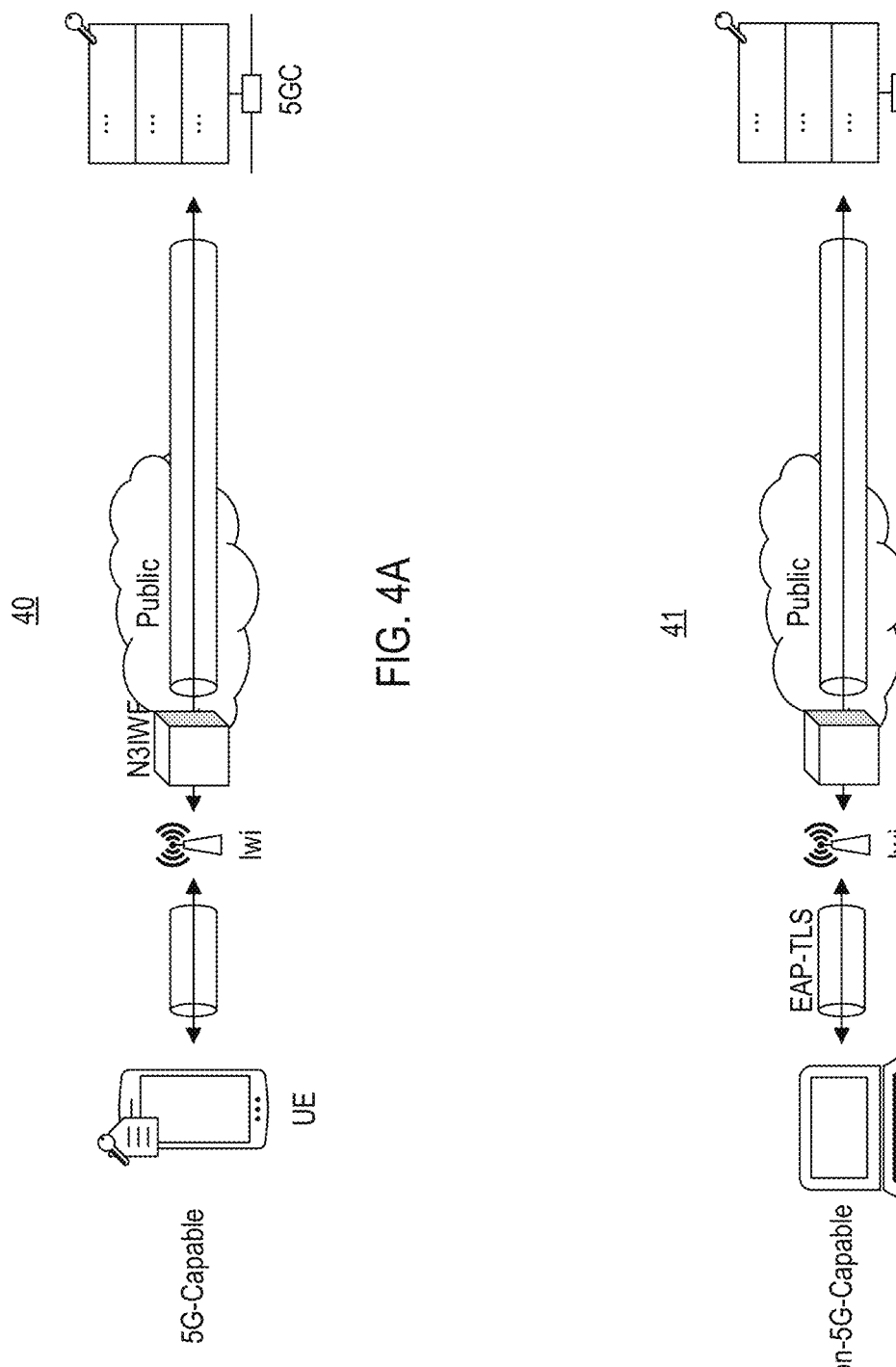
FIGS. 4A-4B illustrate a plurality of configurations of Internet Protocol (IP) network cybersecurity between a client device and a server, according to examples.

FIGS. 4A-4B illustrates a plurality of configurations 40, 41 of Internet Protocol (IP) network cybersecurity between a client device and a server (e.g., a core network server), according to examples. In FIG. 4A, in some examples, the configuration 40 may facilitate cellular communication between a 5G-capable device and a network server (e.g., a core network server) via implementation of a security gate- way. In FIG. 4B, in some examples (and as discussed further below), the configuration 41 may facilitate cellular commu- nication between a non-5G-capable device and a network server (e.g., a core network server) via implementation of a security gateway.

In some examples, implementation of a 3rd Generation Partnership Project (3GPP) protocol may be based on a trust model. In some examples and as used herein, a "trust model" may be used describe an arrangement of trust relationships between entities or person on a network.

In some examples, a 5G core (5GC) (with a 5G trust model) may implement the Access Management Function (AMF). In some examples, the Access Management Func- tion may provide subscriber authentication (e.g., based on subscriber identity module (SIM)). Accordingly, in some examples, the Access Management Function (AMF) may serve as a termination point for Non-Access Stratum (NAS) security, which (as discussed further below) may be utilize to attach a device to a 5G network.

In some examples, implementation of a trust model may include collocation of the Security Anchor Function (SEAF) with the Access Management Function (AMF). In some examples, the Security Anchor Function (SEAF) may be utilized for authentication, and may hold a root key (i.e., an "anchor key") for a visited network. In addition, and in particular, Security Anchor Function (SEAF) may enable device authentication when moving between networks with- out requiring full authentication in between.

In some examples, a trust model may include the Authen- tication Server Function (AUSF). In some examples, the Authentication Server Function (AUSF) may be responsible for security procedures associated with subscriber identity module (SIM) authentication (e.g., using the 5G-AKA authentication protocol). Also, in some examples, the Authentication Server Function (AUSF) may keep a key for reuse (e.g., a key derived after authentication), which may be utilized for simultaneous registration of a client in different access network technologies (e.g., multi-path IP).

In some examples, a trust model may include the Authen- tication Credential Repository and Processing Function (ARPF). In some examples, the Authentication Credential Repository and Processing Function (ARPF) may be a functional element of the UDM (Unified Data Manage- ment), and may be responsible for keeping authentication credentials. In some examples, implementation of the Authentication Credential Repository and Processing Func- tion (ARPF) on the core network side may be mirrored by implementation of Universal Subscriber Identity Module (USIM) on the client-side. In some examples, the Unified Data Management (UDM) may be a converged repository of subscriber information that may be utilized for various functionalities such as authentication credential generation, user identification, etc.

In some examples, implementation of a trust model may include the Security Edge Protection Proxy (SEPP). In some examples, Security Edge Protection Proxy (SEPP) may be utilized to, for example, ensure end-to-end confidentiality and integrity between network sources and destinations (e.g., for 5G roaming). In some examples, implementation of a trust model may include implementation of a secure boot (e.g., in user device) with implementation of a secure zone for a storing security credentials (e.g., a universal subscriber identity module (USIM)). In some examples, implementation of a trust model may also include a User Plane Function (UPF) and a Session Management Function (SMF) as well.

In some examples, a 3rd Generation Partnership Project (3GPP) enabled network (e.g., a 5G network) may facilitate a Unified Authentication Framework (UAF). In some examples, the Unified Authentication Framework (UAF) may enable any protocol (e.g., from the trust model dis- cussed above), utilizing any credential to be used to attach securely to a network. Accordingly, it may be appreciated that, in some examples, the Unified Authentication Frame- work (UAF) may enable use of various protocols to define a variety of security gateways.

In particular, these variety of gateways may include gateways that may be utilized with non-5G-capable devices (e.g., Non-5G-capable over WLAN (N5CW)) over various access technologies (e.g., wireline IP or wireless), and gateways that may be utilized with 5G-capable devices (e.g., Non-3rd Generation Partnership Project (3GPP) Interwork- ing Function (N3IWF)) over various access technologies as well. In addition, as will be discussed in further detail below, these variety of gateways may facilitate various protocols (e.g., 5G-AKA, IKEv2, EAP-TLS, etc.), and to implement various credentials (e.g., USIM) and certificates as well.

In some examples, a plurality of protocols that may be implemented by a security gateway may be referred to as a "protocol stack." Under the Unified Authentication Framework (UAF), various defined protocol stacks may be implemented for various wireless and wireline applications.

Figure 5A:
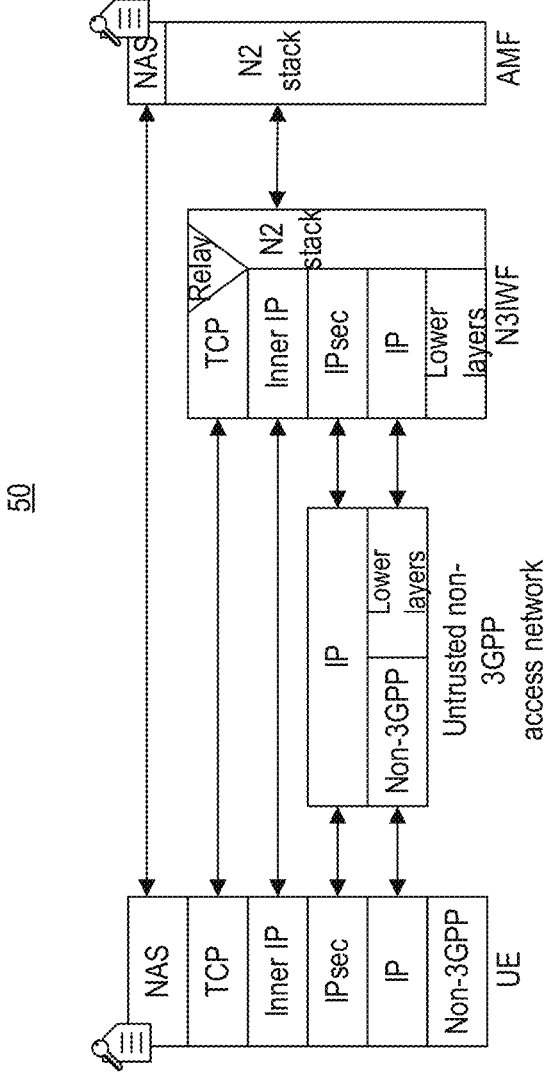
FIGS. 5A-5B illustrate an example of a protocol stack for a gateway, according to an example.
Figure 5B:
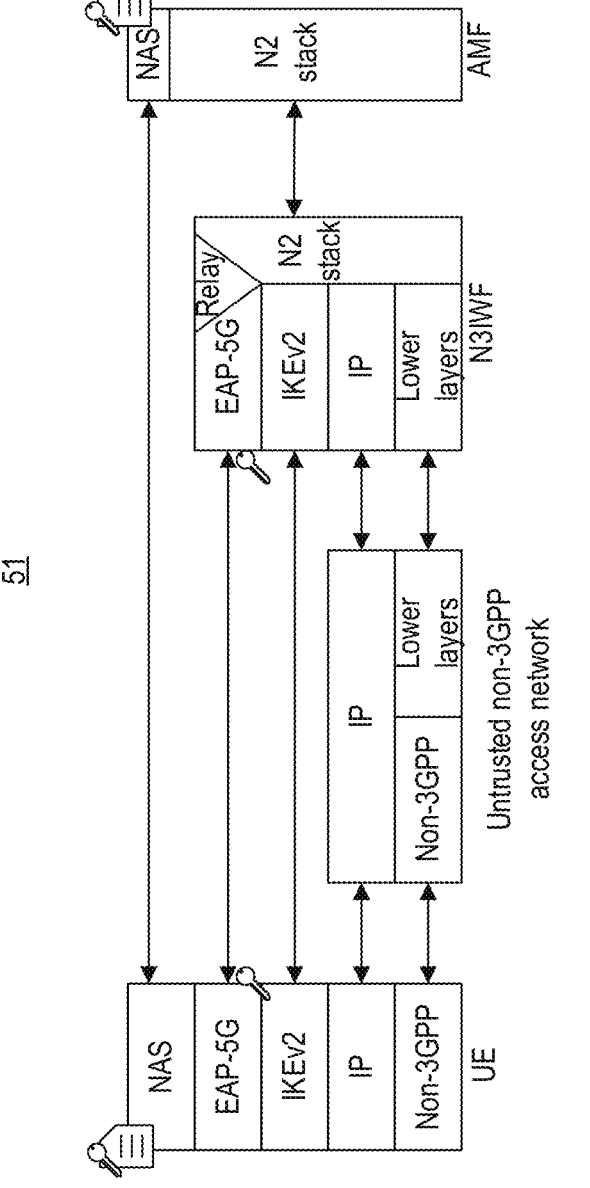

FIGS. 5A-5B illustrate an example of a protocol stack for a gateway, according to an example. In some examples, the protocol stack illustrated in FIGS. 5A-5B may be of a control plane (C-Plane) for a gateway. In particular, FIG. 5A illustrates an example of a protocol stack 50 that may be implemented by a 5G-capable device (N3IWF) security gateway for connecting over Wi-Fi to a 5G network. In some examples, a 5G-capable device (N3IWF) security gateway may utilize a 5G non-access stratum (NAS) protocol to communicate securely with 5G network. In addition, in some examples, the 5G-capable device (N3IWF) security gateway may also utilize a key (e.g., generated via the EAP-5G AKA authentication method) to provide an internet protocol security (IPsec) tunnel. In some examples, the internet protocol security (IPsec) tunnel may provide increased security, as a static, "shared secret" key, which may more easily be exposed, may now be replaced with newly-generated, dynamic key.

FIG. 5B illustrates an example of a protocol stack 51 that may be implemented by a 5G-capable device security gateway (N3IWF) after connecting a device to a 5G network. In some examples, the 5G-capable device security gateway (N3IWF) may operate as a virtual private network (VPN) gateway, and may implement an internet protocol security (IPsec) tunnel that (as discussed above) may be based on Universal Subscriber Identity Module (USIM) credentials and a newly-generated dynamic key.

That is, in some examples and as discussed above, security may be provided for a front-end (i.e., device-to-gateway) side by internet protocol security (IPsec) tunnel, including utilization of a dynamic key for both sides (i.e., device-side and gateway-side). Additionally, in some examples, security may be provided for the back-end (i.e. gateway-to-core) via implementation of an "N2" interface, which may be utilized to connect the security gateway to a cloud or edge-server. In some examples, security for this connection may be provided by an internet protocol security (IPsec) tunnel utilizing a dynamic key (e.g., in a similar manner to that on a front-end), along with implementation of a universal subscriber identity module (USIM) in the gateway. Also, in some examples, it may be based on one or more specified security protocols and/or credentials. It may be appreciated that while the example(s) illustrated in FIGS. 5A and 5B are based on particular implementation (e.g., 5G-capable devices), examples of other protocols stacks (e.g., non-5G capable devices) may be implemented as well.

Accordingly, it may be appreciated that a 3rd Generation Partnership Project (3GPP)-defined gateway may be beneficially utilized to facilitate communication according to a broad range of specifications (e.g., access technologies, protocols, etc.), while nevertheless providing a higher level of security than alternative options (e.g., a typical virtual private network (VPN)). In addition, as discussed above, a 3rd Generation Partnership Project (3GPP)-defined gateway may support various important features, such as device-to-device (D2D) connection and local-breakout.

In some examples, a 3rd Generation Partnership Project (3GPP)-defined gateway may also enable direct connection(s) to core networks (e.g., a mobile network operator (MNO) network) or to private 5G networks. Also, by facilitating 3rd Generation Partnership Project (3GPP)-based network architecture, it may also be possible to provide secure cloud-to-cloud logical and physical connections (e.g., a 3rd Generation Partnership Project (3GPP) roaming model) to enable any device on a given cloud to be authenticated and connected.

For at least these reasons, it may be appreciated that, in some examples, a 3rd Generation Partnership Project (3GPP)-defined gateway (e.g., implementing N3IWP, N3CW, etc.) may be utilized for metaverse security. As used herein a security gateway (e.g., 3rd Generation Partnership Project (3GPP)-defined gateway) that may facilitate one or more aspects of operation for the metaverse may be referred to as a "metaverse security gateway."

In some examples, the systems and methods may enable communication between one or more disparate networks and network devices utilizing various connection technologies, as described herein. In particular, in some examples, the systems and methods provided herein may utilize existing technologies to provide and facilitate metaverse network connections. In some examples, the systems and methods may utilize design practices and architecture (e.g., utilize 5G design practices and architecture) to provide and facilitate communication between various network entities (e.g., client devices, core network servers, security gateways, etc.). Accordingly, in some examples, the systems and methods may utilize these design practices and architecture to enable support of a variety of devices, by enabling them to attach and roam between different network clouds, as may be necessary for an efficient and seamless implementation of the metaverse.

In some examples, the systems and methods may implement design practices and architecture that may provide a layered trust model, including one or more layers that ensure minimum exposure of security credentials. Moreover, in some examples, the systems and methods may provide security that may be on a hop-to-hop and end-to-end basis, thereby protecting both data-in-motion and data-at-rest, as well as protecting user privacy. In some examples and as discussed further below, this may be achieved by implementation of one or more security features such as mutual-authentication, dynamic key generation, encryption, and data integrity protection.

Also, in some examples, the systems and methods may implement 3rd Generation Partnership Project (3GPP) technologies (e.g., protocols, standards, etc.) to enable a device to authenticate and communicate with one or more clouds or cloud servers. In some examples, the authentication and communication process may be similar to authentication and communication process with a core network.

It may be appreciated that, in some examples, a 3rd Generation Partnership Project (3GPP)-defined gateway may not be implemented directly as a security gateway for the metaverse. Accordingly, in some examples, the systems and methods described herein may achieve metaverse compatibility via use of one or more additions and/or modifications to an existing network entity (e.g., a 3rd Generation Partnership Project (3GPP)-defined gateway). Indeed, as discussed further below, these additions and/or modifications may enable metaverse elements (e.g., metaverse security gateways, core network servers, edge servers, etc.) to leverage beneficial security architecture and protocols (e.g., 3rd Generation Partnership Project (3GPP)), while supporting integration of new security solutions (e.g., Fast IDentity Online 2 (FIDO-2) as well.

In some examples, the systems and methods may provide a system, comprising a security gateway, a processor, a memory storing instructions, which when executed by the processor, cause the processor to modify the security gateway to provide a metaverse security gateway by implementing a protocol associated with a 3rd Generation Partnership Project (3GPP) standard, and utilize the metaverse security gateway to facilitate a metaverse communication for a client device. In some examples, the modification to the security gateway includes support of Fast IDentity Online (FIDO). In some examples, the modification to the security gateway or core network elements may further include assigning a proxy subscriber identity module (SIM) to the client device. In some examples, the metaverse security gateway or the core network may connect any device type (e.g., a plurality of device types) or may implement any security credential type (e.g., a plurality of security credential types) to facilitate a metaverse communication. In some examples, the modification to the security gateway or the core network may include implementing a non-access stratum (NAS) layer in a protocol stack of the security gateway or the core network. In some examples, the systems and methods may also modify a server to provide a metaverse server by implementing a protocol associated with the 3rd Generation Partnership Project (3GPP) standard, wherein the modification to the server includes implementing at least one functional block associated with the 3rd Generation Partnership Project (3GPP) standard. In some examples, the systems and methods may also enable and/or facilitate a modification of an aspect of the client device (e.g., a user device) to utilize Fast IDentity Online (FIDO) standard in association with the security gateway (or metaverse security gateway). It should be appreciated that the systems and methods may relate to a client device that may implement the modification of the client device as well.

In some examples, the systems and methods may provide modifying a security gateway to provide a metaverse security gateway by implementing a first protocol associated with a 3rd Generation Partnership Project (3GPP) standard, modifying a server to provide a metaverse server by implementing a second protocol associated with the 3rd Generation Partnership Project (3GPP) standard, and utilizing the metaverse security gateway and the metaverse server to facilitate a metaverse communication between a plurality of network devices utilizing a plurality of connection technologies. In some examples, the first protocol and the second protocol may be the same protocol.

In some examples, the systems and methods may provide a non-transitory computer-readable storage medium having an executable stored thereon, which when executed instructs a processor to modify a security gateway to provide a metaverse security gateway by implementing a protocol (e.g., a first protocol) associated with a 3rd Generation Partnership Project (3GPP) standard, modify a server to provide a metaverse server by implementing a protocol (e.g., a second protocol) associated with the 3rd Generation Partnership Project (3GPP) standard, and utilize the metaverse security gateway and the metaverse server to facilitate a metaverse communication for a client device. In some examples, the modification to the server includes implementing at least one functional block associated with the 3rd Generation Partnership Project (3GPP) standard. Also, in some examples, the at least one functional block includes at least one of Access Management function (AMF), Security Anchor function (SEAF), Authentication Server Function (AUSF), Authentication Credential Repository and Processing Function (ARPF), Unified Data Management (UDM) and Security Edge Protection Proxy (SEPP). In some examples, a trust model may include a User Plane Function (UPF) and a Session Management Function (SMF).

In some examples, the systems and methods described herein may provide metaverse compatibility for an existing device (e.g., client device) with one or more modifications. In other examples, the systems and methods described herein may provide metaverse compatibility without any need for modification to the device.

In some examples and as discussed above, implementation of 3rd Generation Partnership Project (3GPP) may be available to both 5G-capable and non-5G-capable devices. So, in some examples, to implement 3rd Generation Partnership Project (3GPP), a 5G-capable device (e.g., smart phones) may include a non-access stratum (NAS) layer within its stack, may utilize a Universal Subscriber Identity Module (USIM) (e.g., a subscriber identity module (SIM) card) for storing security credentials, and/or may utilize Fast IDentity Online (FIDO) for application-level security. Also, with regard to non-5G-capable devices, the non-5G-capable device may utilize certificates and passwords as authentication credentials. In the alternative, some non-5G-capable devices may utilize Fast IDentity Online (FIDO) authentication as well. Accordingly, for metaverse compatibility, there may be no need for modification to a device protocol stack of either a 5G-capable devices or non-5G-capable devices.

In some examples, software of a user device (e.g., mobile handset) may be modified to enable deviation from 3rd Generation Partnership Project (3GPP) protocols and procedures. For example, in some instances, (native) software of a user device may be modified to facilitate use of Fast IDentity Online (FIDO) protocol in association with a security gateway. In particular, in some examples, an over-the-top (OTT) application may be utilized to facilitate the use of Fast IDentity Online (FIDO) protocol in association with a security gateway. Also, in some examples, (native) software of a user device or an over-the-top (OTT) application may be utilized to support 3rd Generation Partnership Project (3GPP) protocols and procedures, and may enable deviations from 3rd Generation Partnership Project (3GPP) protocols and procedures as well.

In some examples, the systems and methods described herein may enable a security gateway (e.g., 3rd Generation Partnership Project (3GPP)-defined gateway) implemented to facilitate the metaverse (i.e., a "metaverse security gateway"). In some examples, and as will be discussed further below, these modifications may be made by a network infrastructure operator associated with the metaverse security gateway. It may be appreciated that these modifications may be implemented via software, hardware, or any combination thereof.

As discussed above, devices may be placed in one of two categories: 5G-capable devices and non-5G-capable devices. In some examples, 3rd Generation Partnership Project (3GPP) may implement a N3IWF (Non-3rd Generation Partnership Project (3GPP) Inter-working function) gateway that may enable connection of 5G-capable devices (i.e., devices with NAS layer) to a 5G core network. Also, in some examples, 3rd Generation Partnership Project (3GPP) may implement a N5CW (Non-5G-Capable over WLAN) gateway that may enable connection of non-5G capable devices (e.g., devices without the NAS layer).

Also, as discussed above, 3rd Generation Partnership Project (3GPP) may be utilized to enable a variety of security gateways to be defined. In some examples, various technologies (e.g., protocols, methods, etc.) may be integrated to provide one, uniform metaverse security gateway (also referred to herein as a "universal" metaverse security gateway), which may be implemented in a variety of settings to facilitate the metaverse. So, in some examples, a security gateway as described may support both 5G-capable devices and non-5G-capable devices.

Furthermore, in some examples, a modification to the security gateway may include implementing a Fast IDentity Online (FIDO) server in the security gateway. In addition, in some examples, the modification to the security gateway may further include assigning (e.g., via implementation of a security gateway (SecGW)) a proxy subscriber identity module (SIM) to the client device. Also, in some examples, the modification to the security gateway may include implementation of an internet protocol security (IPsec) tunnel utilizing a dynamic key and a universal subscriber identity module (USIM).

Figure 6:
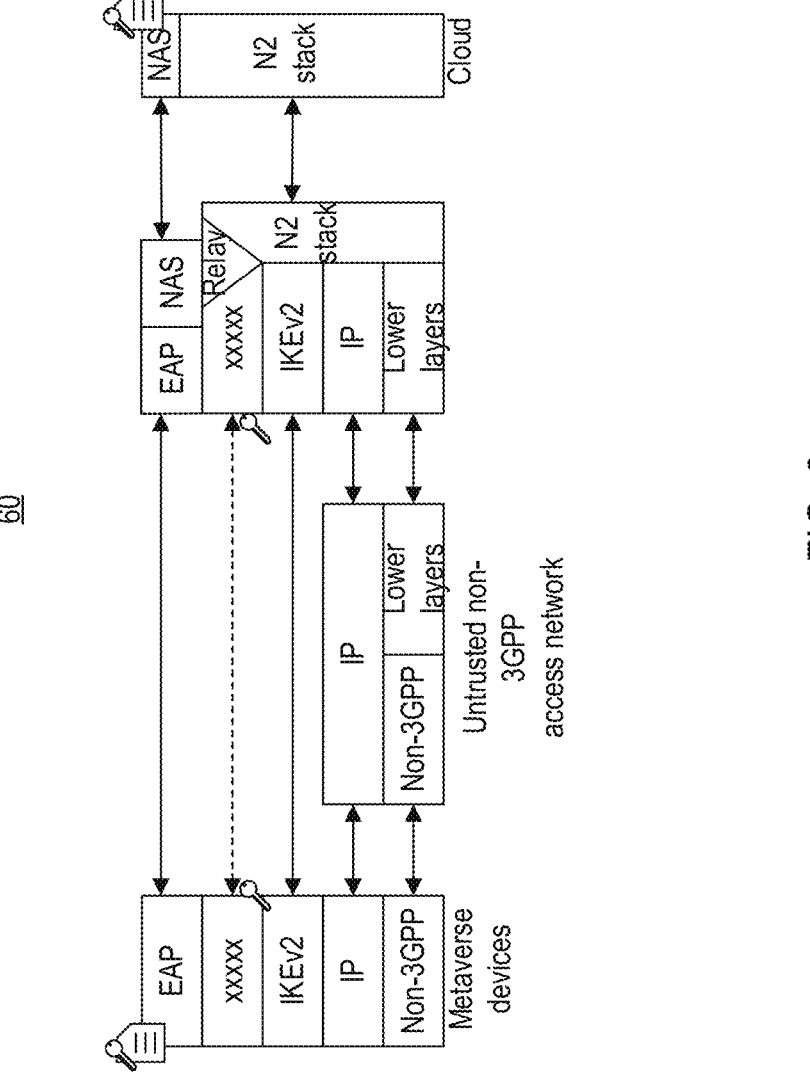
FIG. 6 illustrates an example of a protocol stack for a metaverse security gateway, according to an example.

FIG. 6 illustrates an example of a protocol stack for a metaverse security gateway, according to an example. In particular, FIG. 6 illustrates an example of a protocol stack 60 of a 5G-capable device (N3IWF) metaverse security gateway that may facilitate the metaverse.

In some examples, to provide compatibility with and facilitation of the metaverse, a non-access stratum (NAS) layer may be added to the protocol stack of a 5G-capable device (N3IWF) metaverse security gateway. In some examples, this may make it possible to authenticate non-5G-capable devices within a network. Also, in some examples, the metaverse security gateway may include an extensible authentication protocol (EAP), which may enable use of transport layer security (TLS) and EAP-AKA authentication by the gateway.

Furthermore, in some examples, to enable metaverse compatibility, the metaverse security gateway may implement a specified authentication protocol. It may be appreciated that any protocol may be utilized, as long as the protocol may generate one or more fresh (i.e., new) keys that may be utilized for an AUTH field of the IKEv2 layer on both the client device-side and the gateway-side.

In some examples, additional features of and/or modifications to the metaverse security gateway may be provided as well. In one example, to enable metaverse compatibility, a security gateway may be modified to enable Fast IDentity Online (FIDO)-enabled devices to authenticate and attach to a network without a password (i.e., password-less authentication). In some examples, this may be achieved by including a Fast IDentity Online (FIDO) layer in devices and/or gateways (e.g., a metaverse security gateway). In some examples, and as defined by the Fast IDentity Online (FIDO) Alliance, the device may implement a Fast IDentity Online (FIDO) "client), a Fast IDentity Online (FIDO) "authenticator", along with an authenticator-specific module application programming interface (API) provided by an application specific module (ASM) to the Fast IDentity Online (FIDO) client. Furthermore, in some examples, on the gateway side and according to standards implemented via the Fast IDentity Online (FIDO) Alliance, a Fast IDentity Online server may be implemented as well. In some examples, a Fast IDentity Online (FIDO) layer (e.g., as shown in FIG. 6) may be implemented without an extensible authentication protocol (EAP) layer as well. In some examples, Fast IDentity Online (FIDO) may implement secure hardware for storing credentials. So, in some examples, by implementing Fast IDentity Online (FIDO) to provide a means for authentication and, in particular, generation of security keys for encryption, a Fast IDentity Online (FIDO)-enabled device may be compatible with the metaverse.

In some examples, a metaverse security gateway may utilize Fast IDentity Online (FIDO) to act like a universal subscriber identity module (USIM) in Fast IDentity Online (FIDO)-enabled devices. That is, in some examples, a core network server may utilize a subscriber identity module (SIM) to authenticate. To accomplish this, in some examples, a metaverse security gateway may implement a proxy subscriber identity module (SIM) for authentication.

In some examples, in each instance that Fast IDentity Online (FIDO) may be utilized to connect to a metaverse security gateway (and provided an authentication may be valid), the metaverse security gateway may assign a proxy subscriber identity module (SIM) to the user, and may authenticate with an associated device with the core network. That is, in some examples, the proxy subscriber identity module (SIM) generated by the metaverse security gateway may cause the core network (e.g., core network server) to think it may be communicating with a subscriber identity module associated with the device, but it may really be administered and associated with the metaverse security gateway. In some examples, the proxy subscriber identity module (SIM) may be implemented via software, hardware, or a combination thereof. Also, it may be appreciated that there may be a number of other ways that Fast IDentity Online (FIDO) may be utilized by the metaverse security gateway to facilitate connection to the metaverse. For example, in some instances, a Fast IDentity Online (FIDO) server may be executed in concert with a security gateway in a core network or on a dedicated and/or separate server in the network, with logical and physical connections to the security gateway and/or the core network (e.g. utilizing an access management function (AMF).

Accordingly, in some examples, a metaverse security gateway may attach a plurality of device types via a plurality of authentication methods (e.g., universal subscriber identity module (USIM), Fast IDentity Online (FIDO), or certificates). In addition, the metaverse security gateway may utilize 5G security architecture to implement (among other things) a layered trust model, utilize dynamic keys, and implement security protocols that may protect data on hop-by-hop basis.

In some examples, to leverage 5G security trust model and protocols and to provide metaverse compatibility, one or more additions and/or modifications may be made to a server (e.g., a cloud server, an edge server, etc.). As used herein, a "metaverse server" may include may include any server that implemented to facilitate the metaverse. Examples may include core network servers, service provider servers, and third party servers. In some examples, these additions and/or modifications may be made by a network infrastructure operator. In some examples, these additions may be implemented via hardware, software, or any combination thereof. In some examples, this may include implementing a Fast IDentity Online (FIDO) server in a 5G core (5GC) network. In addition, in some examples, the modification to the security gateway may further include assigning (e.g., via implementation of a 5G core (5GC) network) a proxy subscriber identity module (SIM) to the client device. Also, in some examples, this may include implementing the Fast IDentity Online (FIDO) standard on a dedicated server. Moreover, in some examples, the modification to the security gateway may further include assigning (e.g., via implementation of a dedicated server) a proxy subscriber identity module (SIM) to the client device.

In some examples, the additions and/or modifications to enable a metaverse server may include one or more functional blocks (e.g., from a trust model). In some examples, the one or more functional blocks may be implemented to simulate 3rd Generation Partnership Project (3GPP) core network security, authentication, and connection. In particular, the one or more functional blocks may provide, among other things, authentication, key generation, storing of user credentials (e.g., symmetric keys), and secure connection(s) between clouds and servers. In some examples, the one or more functional blocks may each be developed or procured individually, and may be integrated in any combination (i.e., utilizing a selected transport protocol used for a given cloud).

In some examples, a metaverse server (e.g., implementing a 5G trust model) may utilize the Access Management Function (AMF). In some examples, the Access Management Function may provide subscriber authentication (e.g., based on SIM). Accordingly, in some examples, the Access Management Function (AMF) may serve as a termination point for Non-Access Stratum (NAS) security, which (as discussed further below) may be utilize to attach a device to the network.

In some examples, implementation of a trust model may include collocation of the Security Anchor Function (SEAF) with the Access Management Function (AMF). In some examples, the Security Anchor Function (SEAF) may be utilized for authentication, and may hold a root key (i.e., an "anchor key") for a visited network.

In some examples, a metaverse server may implement the Authentication Server Function (AUSF). In some examples, the Authentication Server Function (AUSF) may be responsible for security procedures associated with subscriber identity module (SIM) authentication (e.g., using the 5G-AKA authentication protocol). Also, in some examples, the Authentication Server Function (AUSF) may keep a key for reuse (derived after authentication), that may be utilized for simultaneous registration of a client in the same or different access network technologies (e.g., multi-path IP).

In some examples, a metaverse server may implement the Authentication Credential Repository and Processing Function (ARPF). In some examples, the Authentication Credential Repository and Processing Function (ARPF) may be a functional element of the UDM (Unified Data Management), and may be responsible for keeping authentication credentials. In some examples, implementation of the Authentication Credential Repository and Processing Function (ARPF) on the core network side may be mirrored by implementation of Universal Subscriber Identity Module (USIM) on the client-side.

In some examples, a metaverse server may implement the Unified Data Management (UDM). In some examples, the Unified Data Management (UDM) may be a converged repository of subscriber information that may be utilized for various functionalities such as authentication credential generation, user identification, etc.

In some examples, a metaverse server may implement the Security Edge Protection Proxy (SEPP). In some examples, Security Edge Protection Proxy (SEPP) may be utilized to ensure end-to-end confidentiality and integrity between network sources and destinations (e.g., for 5G roaming).

In some examples, a metaverse server may implement a User Plane Function (UPF). In some examples, the User Plane Function (UPF) may facilitate an N3 interface that may exist between a security gateway and a metaverse server.

In some examples, a metaverse server may implement the Session Management Function (SMF). In some examples, the Session Management Function (SMF) may be utilized to support a User Plane Function (UPF) (e.g., a User Plane Function (UPF) operation) that may be implemented by a metaverse server."

Figure 7:
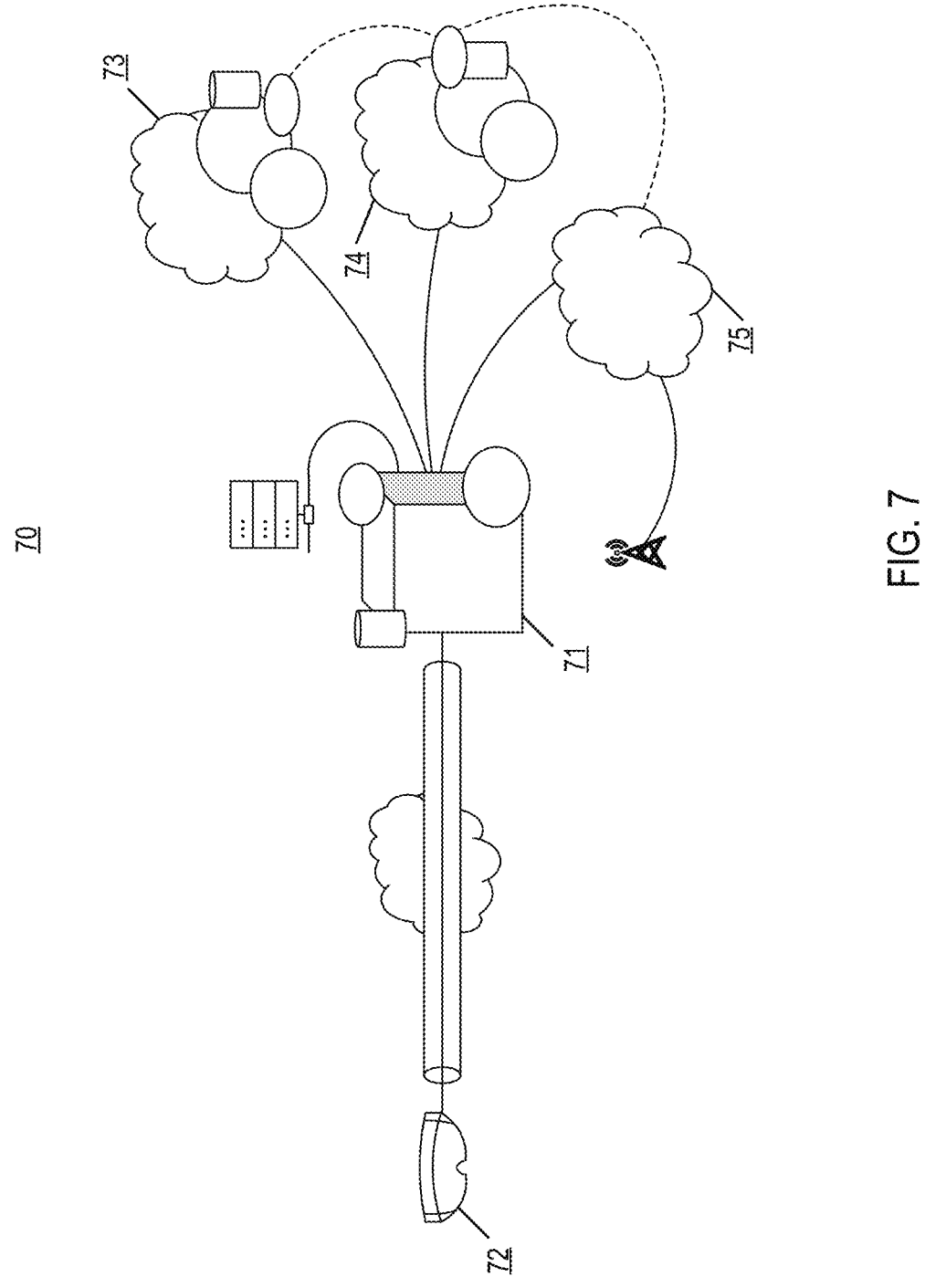
FIG. 7 illustrates a plurality of network elements of a communication network for implementing the metaverse, according to an example.

FIG. 7 illustrates a plurality of network elements of a communication network 70 to implement the metaverse, according to an example. In some examples, the metaverse security gateway 71 may enable access between a user device 72 and the network elements 73-75. In some examples, the network elements 73-75 may include a first metaverse server 73 having a pre-existing association with the user device 72. In one example, the user device 72 may be a virtual reality (VR) headset, and the first metaverse server 73 may be maintained by the virtual reality (VR) headset provider. In some examples, the network elements may include a second metaverse server 74 and a cellular network 75. In some examples, the second metaverse server 74 may be unknown to the user device 72.

In some examples, FIG. 7 may provide an "end-to-end" metaverse security architecture. In particular, the metaverse security gateway 71 may include one or more of the (security gateway-side) additions and/or modifications discussed above for enabling metaverse compatibility, and the network elements 73-75 may include one or more of the (server-side) additions and/or modifications discussed above for enabling metaverse compatibility as well.

It may be appreciated that although a single, centralized gateway is shown in FIG. 7, a distributed or hybrid architecture may be implemented as well. In some examples, the end-to-end metaverse security architecture shown in FIG. 7 may enable end-to-end protection of data, and may implement trust zones that may limit exposure of security credentials. In particular, in some examples, security credentials may be stored via subscriber identity module (SIM) or Fast IDentity Online (FIDO) on the device side, and may be stored in a data repository center on the network side, with no access to master keys by any entity. In this manner, a 5G-based trust implemented by the metaverse security architecture may provide minimal exposure of network credentials.

Figure 8A:
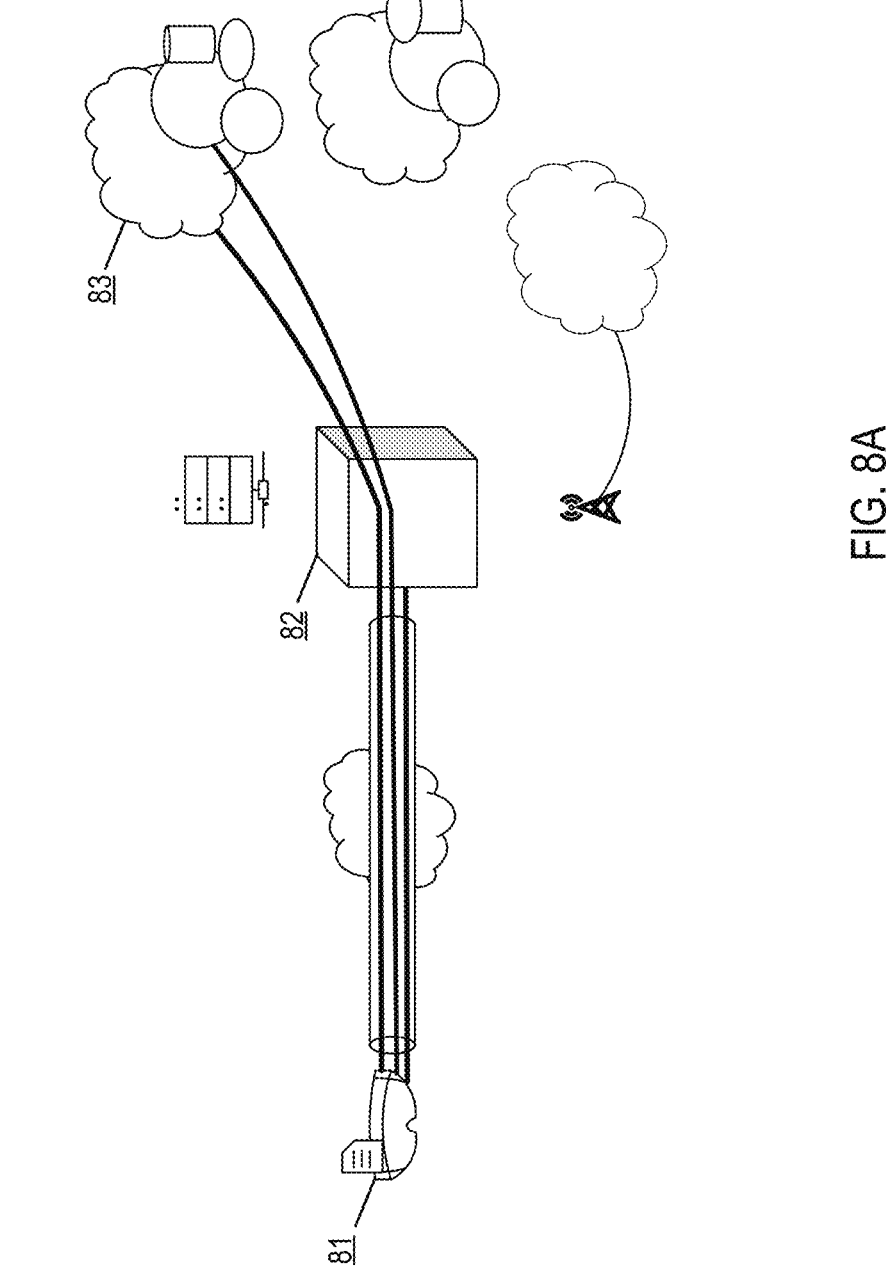
FIGS. 8A-8B illustrate a plurality of network elements of a communication network utilizing one or more metaverse security elements, according to an example.
Figure 8B:
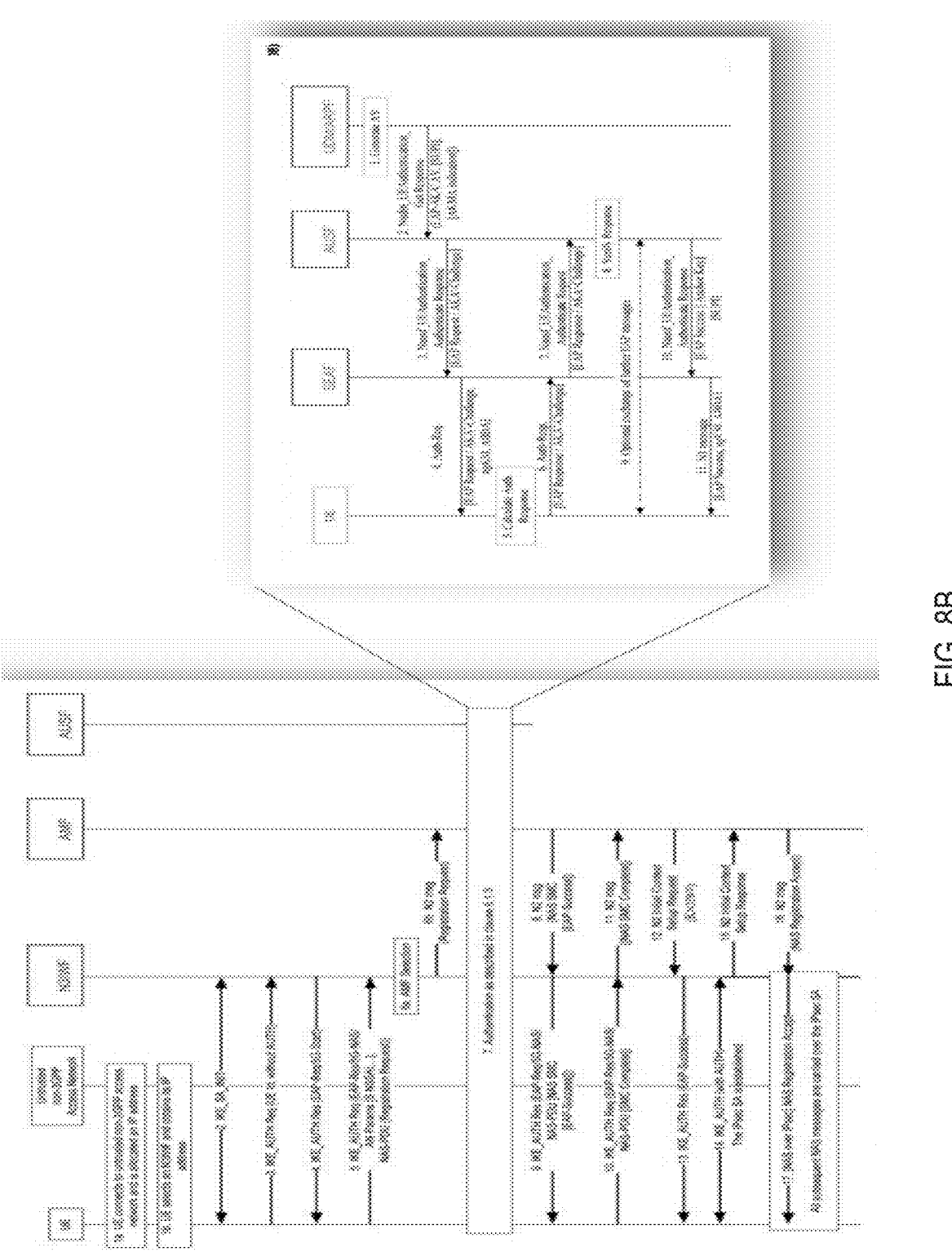

FIGS. 8A-8B illustrates a plurality of network elements of a communication network 80 utilizing one or more metaverse security elements, according to an example. In particular, in some examples and as illustrated in FIG. 8A, a user device 81 may utilize a metaverse security gateway 82 to connect to a metaverse server 83. In some examples, the user device 81 may have a pre-existing association with the metaverse server 83. In one example, the user device may be a virtual reality (VR) headset that may be looking to connect to the metaverse server operated by the virtual reality (VR) headset provider.

In some examples, the user device 81 may include a subscriber identity module (SIM) card, including one or more credentials. In some examples, the user device 81 may communicate with the metaverse security gateway 82, as described above. In some examples, the metaverse security gateway 82 may enable connection to the metaverse server 83 by utilizing an authentication method (e.g., non-access stratum (NAS) authentication). Upon authentication by the metaverse server 83, communication may be enabled between the user device 81 and the metaverse server 83. FIG. 8B illustrates an example call-flow associated with the example illustrated in FIG. 8A.

Figure 9A:
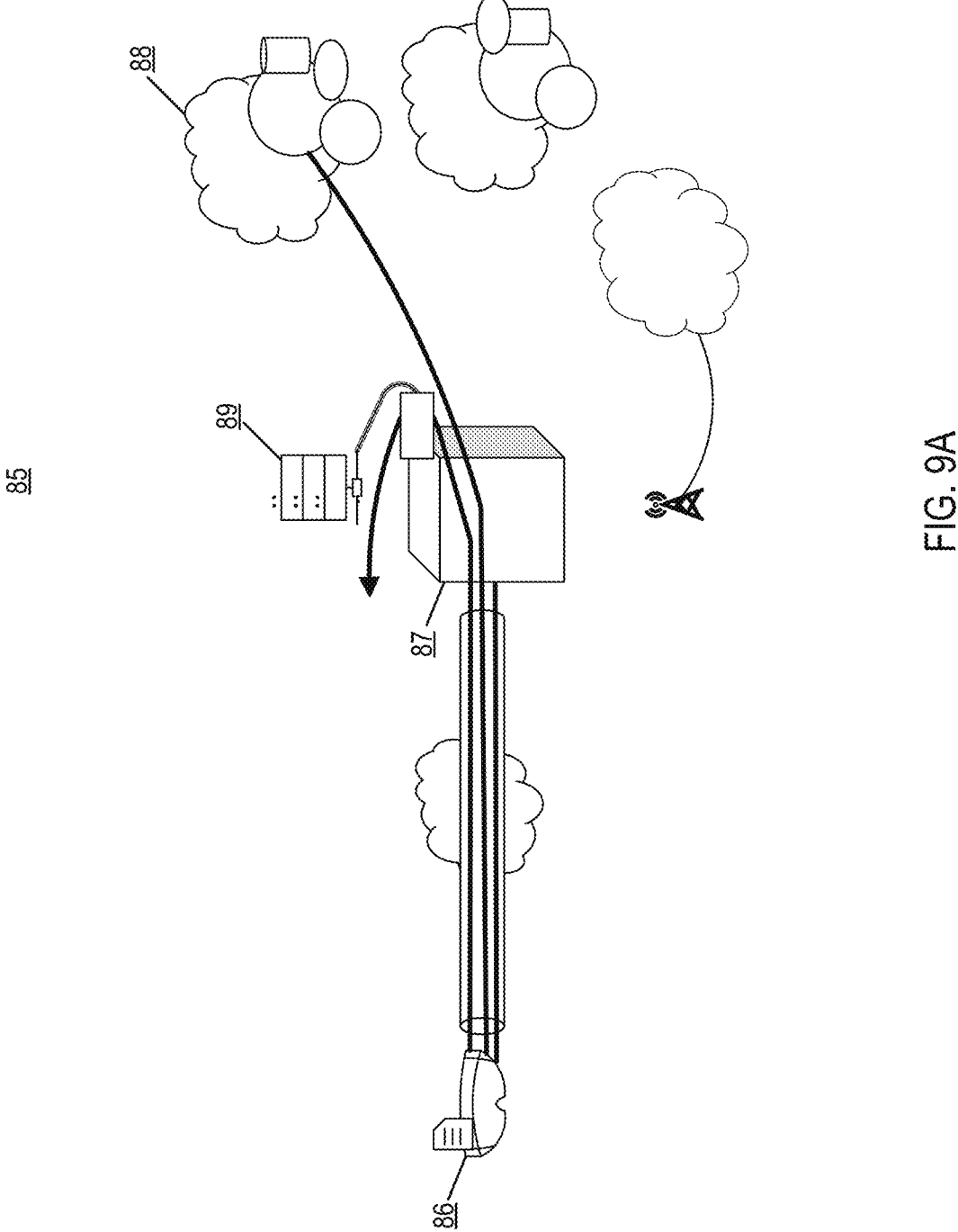
FIGS. 9A-9B illustrate a plurality of network elements of a communication network 85 utilizing one or more metaverse security elements, according to an example.
Figure 9B:
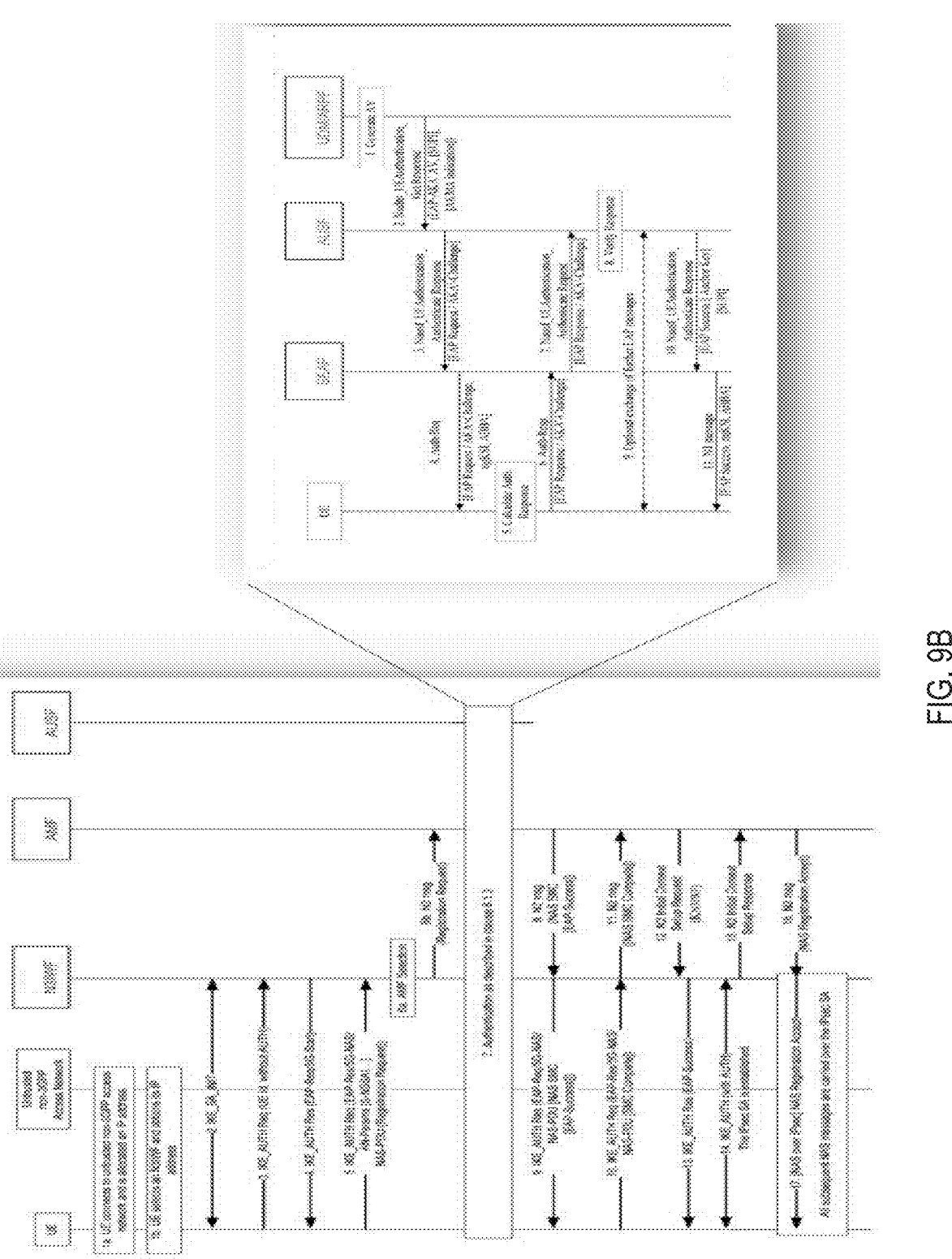

FIGS. 9A-9B illustrates a plurality of network elements of a communication network 85 utilizing one or more metaverse security elements, according to an example. In particular, in some examples and as illustrated in FIG. 9A, a user device 86 may utilize a metaverse security gateway 87 to connect to an edge server 89. In some examples, the connection to the edge server 89 may be facilitated by a metaverse server 88. In some examples, the user device 86 may have a pre-existing association with the metaverse server 88. In one example, the user device 86 may be a virtual reality (VR) headset that may be looking to connect to the metaverse server 88 operated by the virtual reality (VR) headset provider.

In some examples, the user device 86 may include a subscriber identity module (SIM) card, including one or more credentials. In some examples, the user device 86 may communicate with a metaverse security gateway 87, as described above. In some examples, the metaverse security gateway 87 may enable connection to the metaverse server 88 by utilizing an authentication method (e.g., non-access stratum (NAS) authentication). Upon authentication of the user device 86 by the metaverse server 88, session keys (generated by the metaverse server) may be utilized to initiate a session between the user device 86 and the edge server 89. FIG. 9B illustrates an example call-flow associated with the example illustrated in FIG. 9A.

Figure 10A:
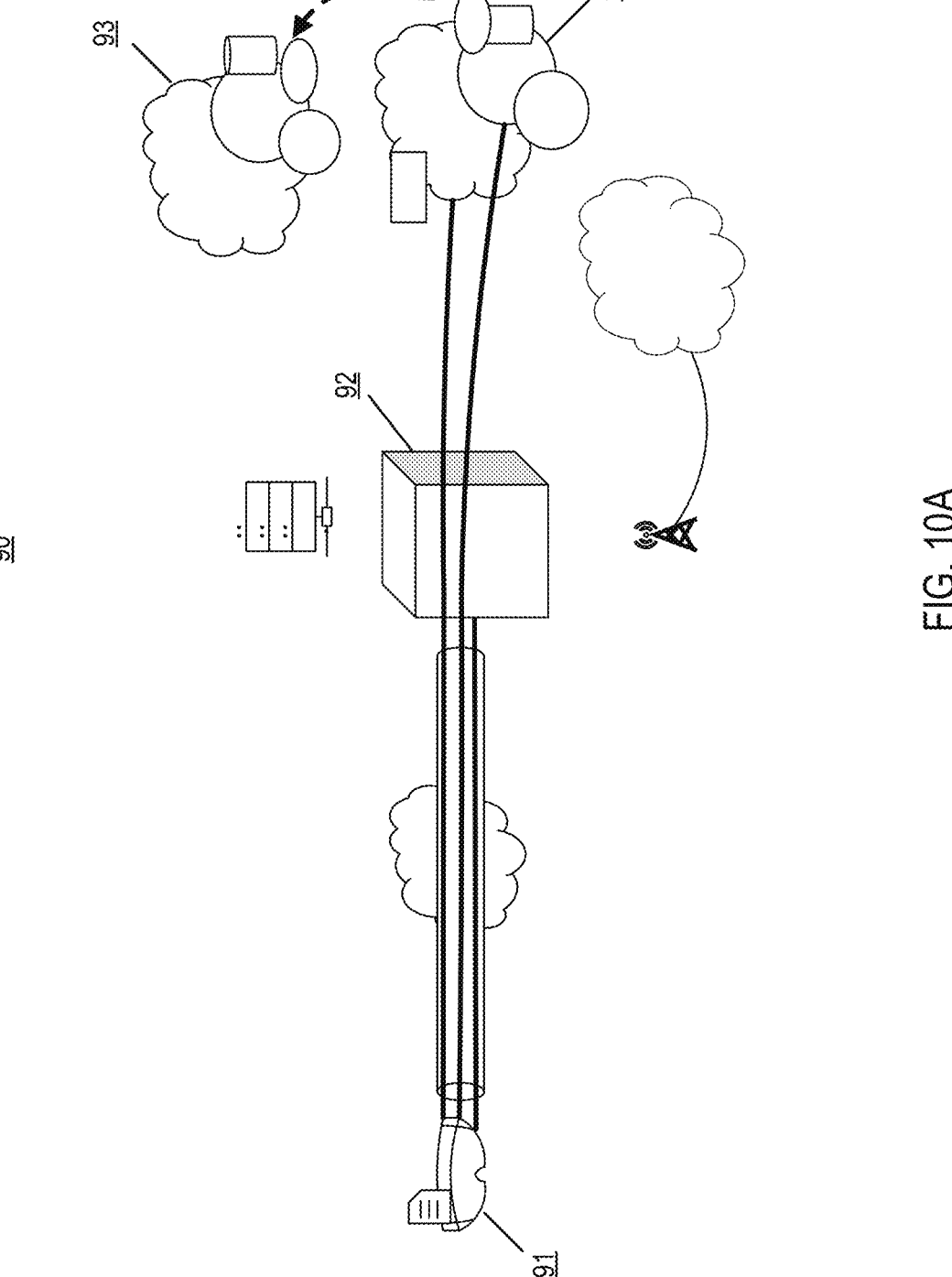
FIGS. 10A-10B illustrate a plurality of network elements of a communication network utilizing one or more metaverse security elements, according to an example.
Figure 10B:
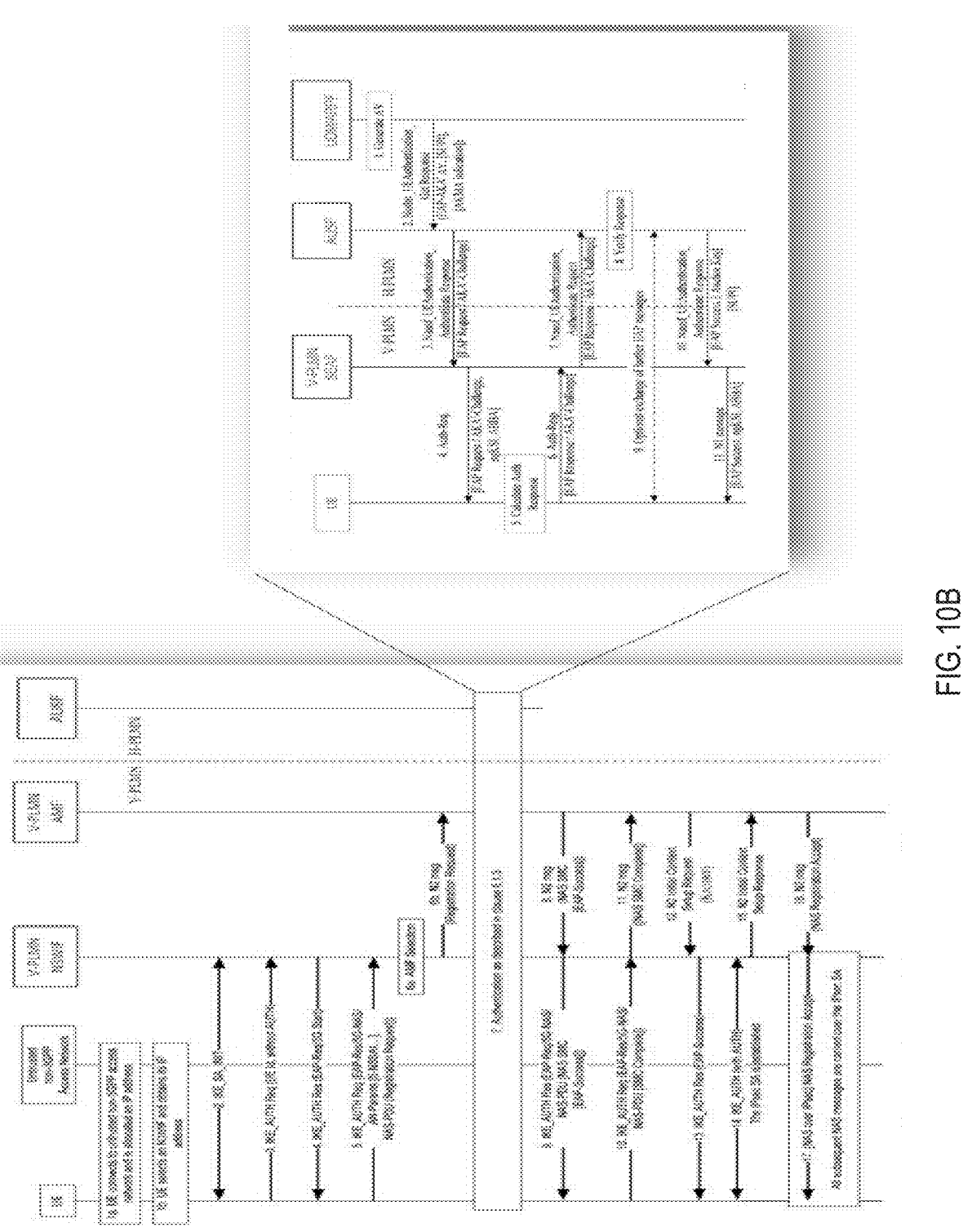
Figure 12A:
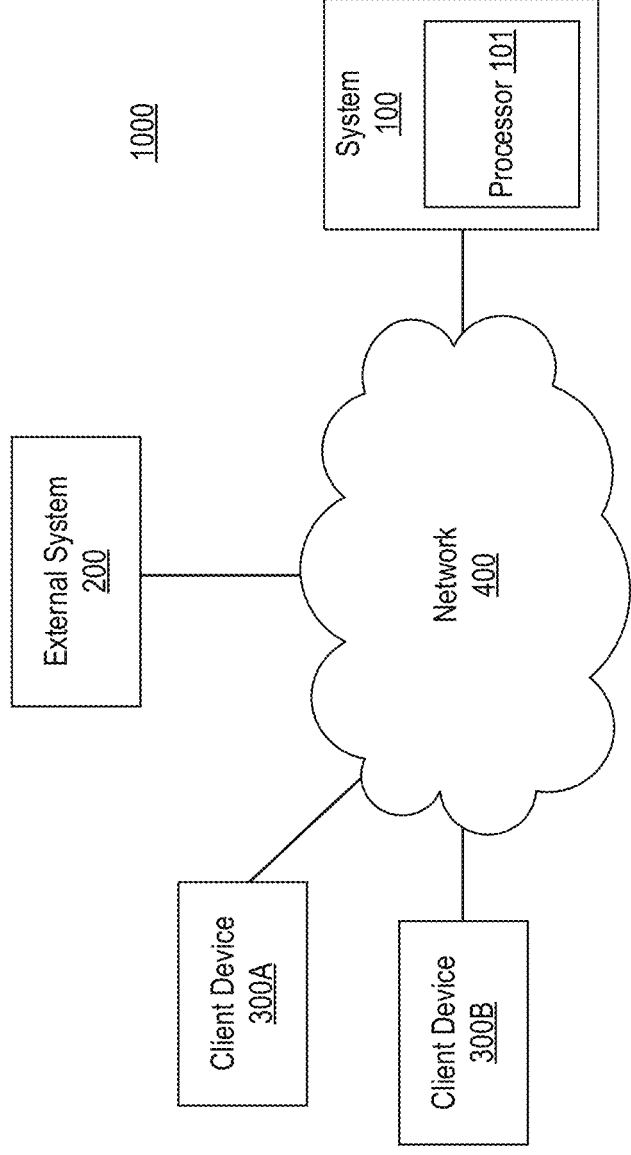
FIGS. 12A-12B illustrate a block diagram of a system environment, including a system, that may be implemented for enabling communication between a plurality of disparate networks and devices utilizing various connection technologies, according to an example.

FIGS. 10A-10B illustrates a plurality of network elements of a communication network 90 utilizing one or more metaverse security elements, according to an example. In particular, in some examples and as illustrated in FIG. 12A, a user device 91 may utilize a metaverse security gateway 92 and a metaverse server 93 as described herein to connect to a third-party server 94 that it may not have a prior association with. In some examples, the user device 91 may be associated with a metaverse server 93, such as an example where the user device 91 may be a virtual reality (VR) headset associated with the metaverse server 93 operated by the virtual reality (VR) headset provider, and wherein the user device 91 may be seeking to attach to the third-party server operated by financial entity (e.g., a bank).

In some examples, the user device 91 may include a subscriber identity module (SIM) card, including one or more credentials. In some examples, the user device 91 may communicate with a metaverse security gateway 92, as described above. In some examples, the metaverse security gateway 92 may enable connection to the third-party server 94 by utilizing an authentication method (e.g., non-access stratum (NAS) authentication). In some examples, the third-party server 94 may determine that the user device 91 may be associated with another party (e.g., the virtual reality (VR) headset provider). In particular, in some examples, the third-party server 94 may utilize the public land mobile network (PLMN) identification (ID) from the subscriber identity module (SIM) to determine an association with the virtual reality (VR) headset provider.

In some examples, the third-party server 94 may connect (e.g., via SEPP) to the metaverse server 93 operated by the virtual reality (VR) headset provider. In particular, in some examples, the third-party server 94 may inform the metaverse server 93 that the user device 91 may be trying to connect, and may request authentication information associated with the user device 91. In some examples, the third-party server 94 may receive the authentication information from the metaverse server 93, and may utilize this information to authenticate the user device 91.

In some examples, authenticating the user device 91 may include the third-party server 94 sending an authentication response (e.g., a challenge response) received from the user device 91 to the metaverse server 93 and receiving approval (i.e., authentication). In some examples, upon authentication, the metaverse server 93 may generate one or more session keys to facilitate communication between the user device 91 and the third-party server 94. FIG. 11B illustrates an example call-flow associated with the example illustrated in FIG. 11A.

Figure 11A:
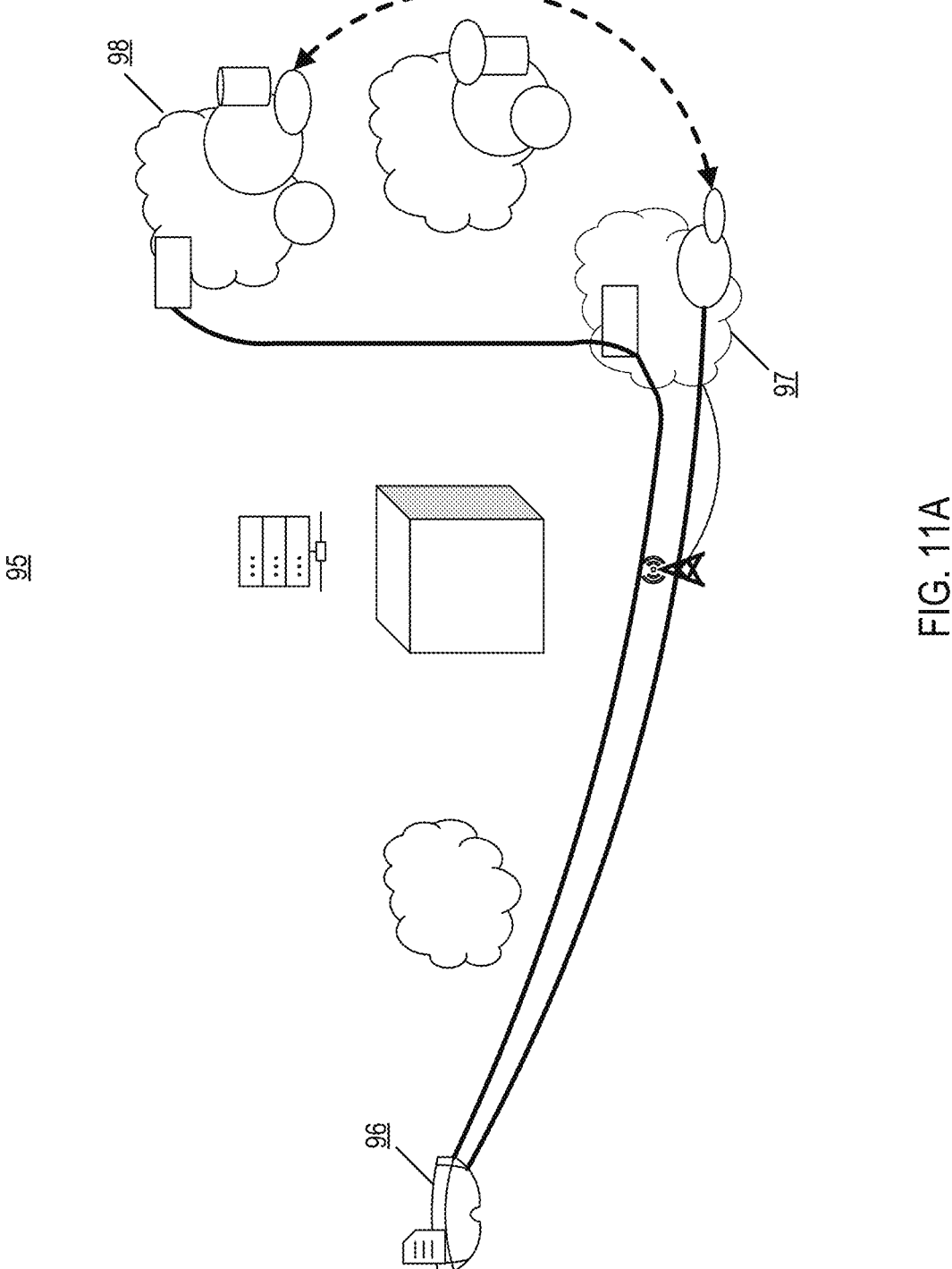
FIGS. 11A-11B illustrate a plurality of network elements of a communication network utilizing one or more metaverse security elements, according to an example.
Figure 11B:
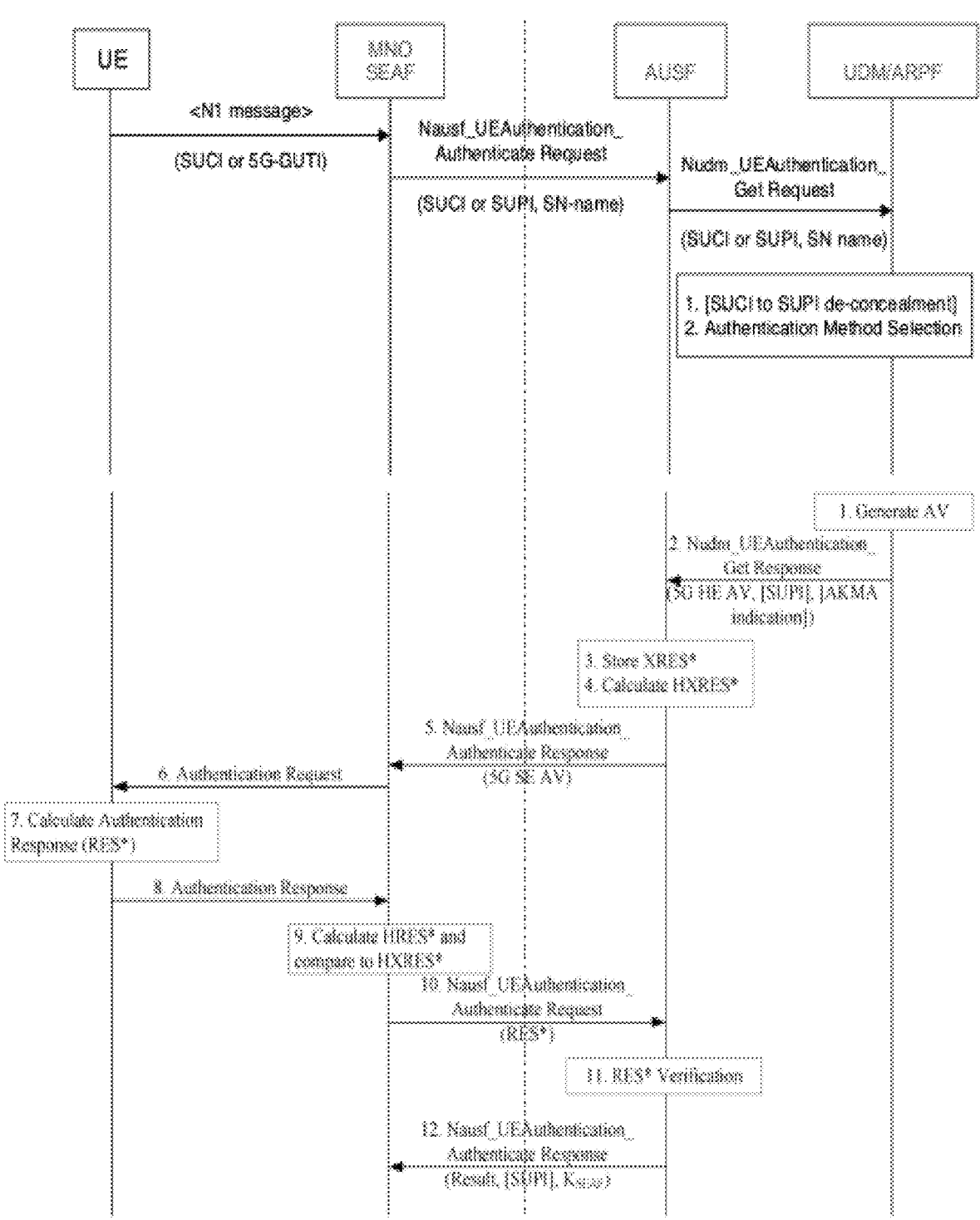

FIGS. 11A-11B illustrates a plurality of network elements of a communication network 95 utilizing one or more metaverse security elements, according to an example. In some examples and as illustrated in FIG. 11A, a user device 96 may utilize a cellular network 97 to connect to a metaverse server 98. In some examples, the user device 96 may have a pre-existing association with the metaverse server 98. In one example, the user device 96 may be a virtual reality (VR) headset that may be looking to connect to the metaverse server 98 operated by the virtual reality (VR) headset provider.

In some examples, other communication technologies (e.g., Wi-Fi) may be unavailable to the user device, and the user device 96 may be unable to connect to a metaverse security gateway. In some examples, the user device may be a 3rd Generation Partnership Project (3GPP)-enabled device, where the user device may communicate with the cellular network.

In some examples, the user device 96 may include a subscriber identity module (SIM) card, including one or more credentials. In particular, in some examples, the cellular network 97 may utilize the public land mobile network (PLMN) identification (ID) from a subscriber identity module (SIM) to determine an association with the virtual reality (VR) headset provider (i.e., the metaverse server 98).

In some examples, the user device 96 may communicate with a metaverse security gateway, as described above. In some examples, the metaverse security gateway may enable connection to the cellular network 97 by utilizing an authentication method (e.g., non-access stratum (NAS) authentication).

In some examples, the cellular network 97 may connect to the metaverse server 98 operated by the virtual reality (VR) headset provider. In particular, in some examples, the cellular network 97 may inform the metaverse server 98 that the user device 96 may be trying to connect, and may request authentication information associated with the user device 96. In some examples, the cellular network 97 may receive the authentication information from the metaverse server 98, and may utilize this information to authenticate the user device 96.

In some examples, authenticating the user device 96 may include the cellular network 97 sending an authentication response (e.g., a challenge response) received from the user device 96 to the metaverse server 98, and receiving approval (i.e., authentication). In some examples, upon authentication, the metaverse server 98 may generate one or more session keys to facilitate communication between the user device 96 and the metaverse server 98 (via the cellular network 97). FIG. 11B illustrates an example call-flow associated with the example illustrated in FIG. 11A.

Figure 12B:
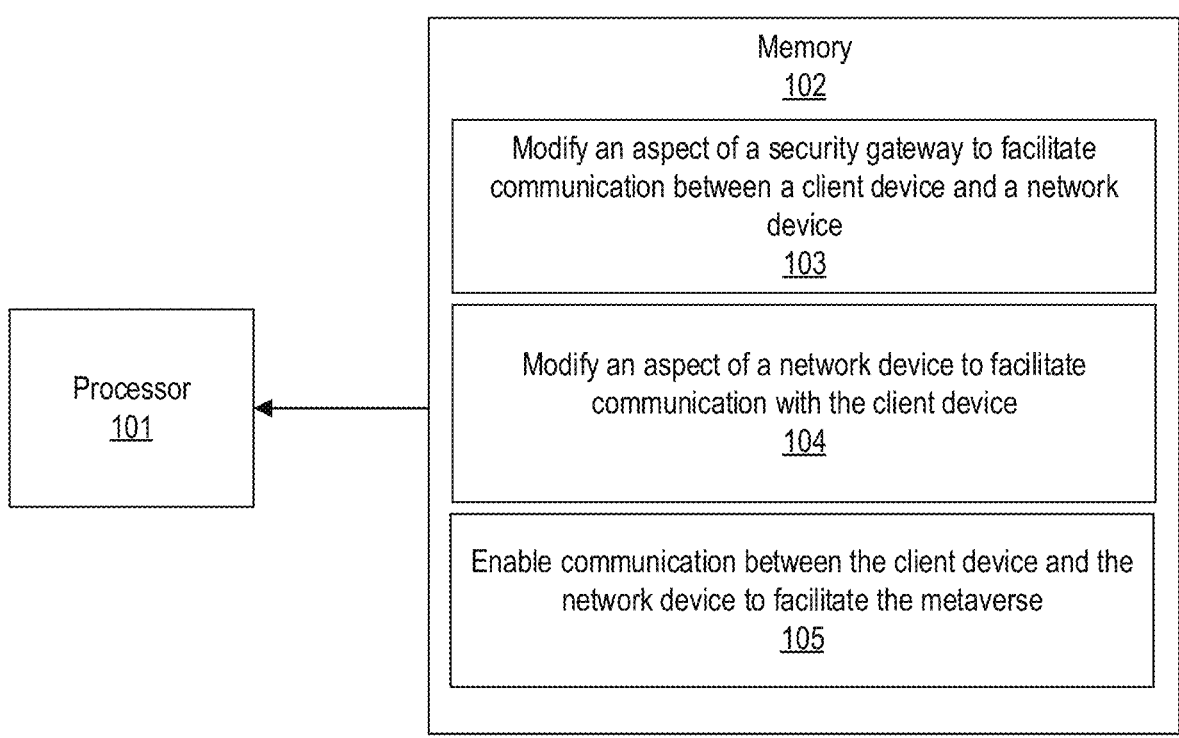

Reference is now made to FIGS. 12A-12B. FIG. 12A illustrates a block diagram of a system environment, including a system, that may be implemented for enabling communication between a plurality of disparate networks and devices utilizing various connection technologies, according to an example. FIG. 12B illustrates a block diagram of the system that may be implemented for enabling communication between a plurality of disparate networks and devices utilizing various connection technologies, according to an example.

As will be described in the examples below, one or more of system 100, external system 200, user devices 300A-B and system environment 1000 shown in FIGS. 12A-12B may be operated by a service provider to enable communication between one or more disparate networks and network devices utilizing various connection technologies. It should be appreciated that one or more of the system 100, the external system 200, the user devices 300A-B and the system environment 1000 depicted in FIGS. 12A-12B may be provided as examples. Thus, one or more of the system 100, the external system 200 the user devices 300A-B and the system environment 1000 may or may not include additional features and some of the features described herein may be removed and/or modified without departing from the scopes of the system 100, the external system 200, the user devices 300A-B and the system environment 1000 outlined herein. Moreover, in some examples, the system 100, the external system 200, and/or the user devices 300A-B may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 12A-12B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the to facilitate the features and functionalities of the system 100, the external system 200, the user devices 300A-B or the system environment 1000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 200 may include any number of servers, hosts, systems, and/or databases that store data to be accessed by the system 100, the user devices 300A-B, and/or other network elements (not shown) in the system environment 1000. In addition, in some examples, the servers, hosts, systems, and/or databases of the external system 200 may include one or more storage mediums storing any data. In some examples, and as will be discussed further below, the external system 200 may be utilized to store any information. As will be discussed further below, in other examples, the external system 200 may be utilized by a service provider (e.g., a social media application provider) as part of a data storage.

In some examples, the user devices 300A-B may be electronic or computing devices that may transmit and/or receive data. In this regard, each of the user devices 300A-B may be any device having computer functionality, such as a television, a radio, a smartphone, a tablet, a laptop, a watch, a desktop, a server, or other computing or entertainment device or appliance. In some examples, the user devices 300A-B may be mobile devices that are communicatively coupled to the network 400 and enabled to interact with various network elements over the network 400. In some examples, the user devices 300A-B may execute an application allowing a user of the user devices 300A-B to interact with various network elements on the network 400. Additionally, the user devices 300A-B may execute a browser or application to enable interaction between the user devices 300A-B and the system 100 via the network 400.

The system environment 1000 may also include the network 400. In operation, one or more of the system 100, the external system 200 and the user devices 300A-B may communicate with one or more of the other devices via the network 400. The network 400 may be a local area network (LAN), a wide area network (WAN), the Internet, a cellular network, a cable network, a satellite network, or other network that facilitates communication between, the system 100, the external system 200, the user devices 300A-B and/or any other system, component, or device connected to the network 400. The network 400 may further include one, or any number, of the exemplary types of networks mentioned above operating as a stand-alone network or in cooperation with each other. For example, the network 400 may utilize one or more protocols of one or more clients or servers to which they are communicatively coupled. The network 400 may facilitate transmission of data according to a transmission protocol of any of the devices and/or systems in the network 400. Although the network 400 is depicted as a single network in the system environment 1000 of FIG. 12A, it should be appreciated that, in some examples, the network 400 may include a plurality of interconnected networks as well.

As shown in FIGS. 12A-12B, the system 100 may include processor 101 and the memory 102. In some examples, the processor 101 may execute the machine-readable instructions stored in the memory 102. It should be appreciated that the processor 101 may be a semiconductor-based microprocessor, a central processing unit (CPU), an application specific integrated circuit (ASIC), a field-programmable gate array (FPGA), and/or other suitable hardware device.

In some examples, the memory 102 may have stored thereon machine-readable instructions (which may also be termed computer-readable instructions) that the processor 101 may execute. The memory 102 may be an electronic, magnetic, optical, or other physical storage device that contains or stores executable instructions. The memory 102 may be, for example, random access memory (RAM), an Electrically Erasable Programmable Read-Only Memory (EEPROM), a storage device, an optical disc, or the like. The memory 102, which may also be referred to as a computer-readable storage medium, may be a non-transitory machine-readable storage medium, where the term "non-transitory" does not encompass transitory propagating signals. It should be appreciated that the memory 102 depicted in FIGS. 12A-12B may be provided as an example. Thus, the memory 102 may or may not include additional features, and some of the features described herein may be removed and/or modified without departing from the scope of the memory 102 outlined herein.

It should be appreciated that, and as described further below, the processing performed via the instructions on the memory 102 may or may not be performed, in part or in total, with the aid of other information and data, such as information and data provided by the external system 200 and/or the user devices 300A-B. Moreover, and as described further below, it should be appreciated that the processing performed via the instructions on the memory 102 may or may not be performed, in part or in total, with the aid of or in addition to processing provided by other devices, including for example, the external system 200 and/or the user devices 300A-B.

In some examples, the memory 102 may store instructions, which when executed by the processor 101, may cause the processor to: modify an aspect of a security gateway to facilitate communication between a client device and a network device; modify an aspect of a network device to facilitate communication with the client device; enable communication between the client device and the network device to facilitate the metaverse.

In some examples, and as discussed further below, the instructions 103-105 on the memory 102 may be executed alone or in combination by the processor 101 to enable communication between one or more disparate networks and network devices utilizing various connection technologies. In some examples, the instructions 103-105 may be implemented in association with a content platform to provide content for users, while in other examples, the instructions 103-105 may be implemented as part of a stand-alone application.

Additionally, and as discussed further below, although not depicted, it should be appreciated that to enable communication between one or more disparate networks and network devices utilizing various connection technologies, the instructions 103-105 may utilize various artificial intelligence (AI) and machine learning (ML) based tools. For instance, these artificial intelligence (AI) and machine learning (ML) based tools may be used to generate models that may include a neural network (e.g., a recurrent neural network (RNN)), natural language processing (NLP), a generative adversarial network (GAN), a tree-based model, a Bayesian network, a support vector, clustering, a kernel method, a spline, a knowledge graph, or an ensemble of one or more of these and other techniques. It should also be appreciated that the system 100 may provide other types of machine learning (ML) approaches as well, such as reinforcement learning, feature learning, anomaly detection, etc.

In some examples, the instructions 103 may modify an aspect of a security gateway to facilitate communication between a client device and a network device. In particular, and as described above, the instructions 103 may modify one or more aspects of a security gateway to enable the security to operate as a metaverse security gateway (i.e., facilitate the metaverse). In some examples, the instructions 103 may enable a non-access stratum layer (NAS) to be added to a protocol stack of the metaverse security gateway. In some examples, the instructions 103 may include a Fast IDentity Online (FIDO) layer to enable Fast IDentity Online (FIDO)-enabled devices to authenticate and connect to a network.

In some examples, the instructions 104 may modify an aspect of a network device to facilitate communication with a client device. In some examples, the instructions 104 may implement one or more functional blocks associated with a trust model to simulate 3rd Generation Partnership Project (3GPP) core security, authentication, and communication practices to provide a metaverse server. Examples of these functional blocks may include Access Management Function (AMF), Security Anchor Function (SEAF), and Authentication Server Function (AUSF), a User Plane Function (UPF), and a Session Management Function (SMF).

In some examples, the instructions 105 may enable communication between a client device and the network device to facilitate the metaverse. In particular, in some examples, the instructions 105 may utilize a metaverse security gateway (e.g., as provided via the instructions 103) and a metaverse server (e.g., as provided via the instructions 104)

to facilitate a metaverse communication associated with the client device. As used herein, a "metaverse communication" may include any communication between a plurality of entities (e.g., user devices, servers, networks, etc.) that may be associated with facilitating the metaverse.

Figure 13:
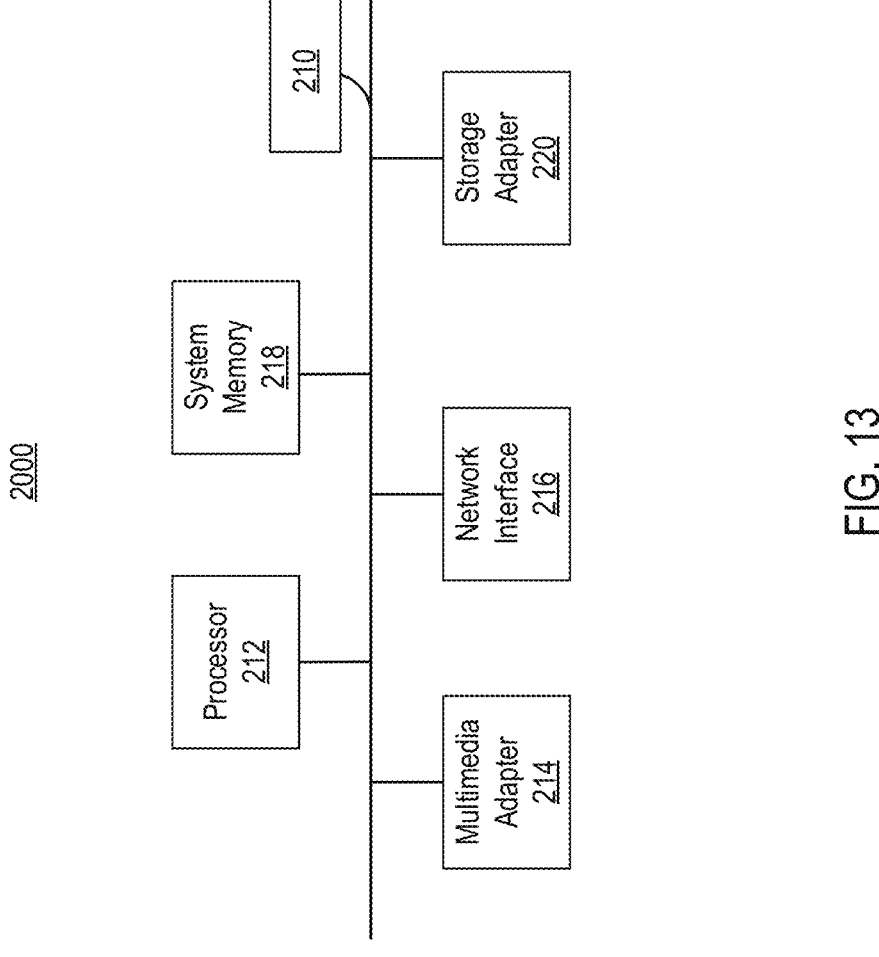
FIG. 13 illustrates a block diagram of a computer system for enabling communication between a plurality of disparate networks and devices utilizing various connection technologies, according to an example.

FIG. 13 illustrates a block diagram of a computer system for enabling communication between a plurality of disparate networks and devices utilizing various connection technologies, according to an example. In some examples, the system 2000 may be associated the system 100 to perform the functions and features described herein. The system 2000 may include, among other things, an interconnect 210, a processor 212, a multimedia adapter 214, a network interface 216, a system memory 218, and a storage adapter 220.

The interconnect 210 may interconnect various subsystems, elements, and/or components of the external system 200. As shown, the interconnect 210 may be an abstraction that may represent any one or more separate physical buses, point-to-point connections, or both, connected by appropriate bridges, adapters, or controllers. In some examples, the interconnect 210 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 210 may allow data communication between the processor 212 and system memory 218, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 212 may be the central processing unit (CPU) of the computing device and may control overall operation of the computing device. In some examples, the processor 212 may accomplish this by executing software or firmware stored in system memory 218 or other data via the storage adapter 220. The processor 212 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 214 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 216 may provide the computing device with an ability to communicate with a variety of remote devices over a network (e.g., network 400 of FIG. 12A) and may include, for example, an Ethernet adapter, a Fibre Channel adapter, and/or other wired- or wireless-enabled adapter. The network interface 216 may provide a direct or indirect connection from one network element to another, and facilitate communication and between various network elements.

The storage adapter 220 may connect to a standard computer-readable medium for storage and/or retrieval of information, such as a fixed disk drive (internal or external).

Many other devices, components, elements, or subsystems (not shown) may be connected in a similar manner to the interconnect 210 or via a network (e.g., network 400 of FIG. 12A). Conversely, all of the devices shown in FIG. 9 need not be present to practice the present disclosure. Code to implement the dynamic approaches for payment gateway selection and payment transaction processing of the present disclosure may be stored in computer-readable storage media such as one or more of system memory 218 or other storage. Code to implement the dynamic approaches for payment gateway selection and payment transaction processing of the present disclosure may also be received via one or more interfaces and stored in memory. The operating system provided on system 100 may be MS-DOS, MS-WINDOWS, OS/2, OS X, IOS, ANDROID, UNIX, Linux, or another operating system.

Figure 14:
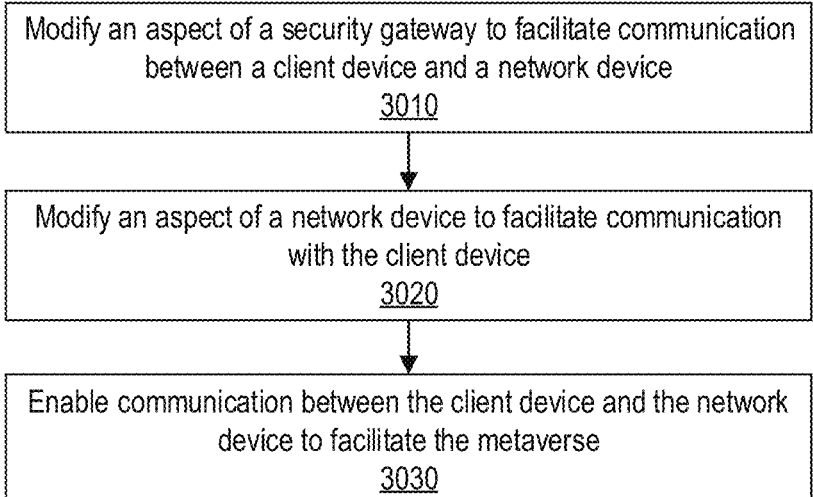
FIG. 14 illustrates a flow diagram of a method for a system, that may be implemented for enabling communication between a plurality of disparate networks and devices utilizing various connection technologies, according to an example.

FIG. 14 illustrates a flow diagram of a method for a system, that may be implemented for enabling communication between a plurality of disparate networks and devices utilizing various connection technologies, according to an example. The method 3000 is provided by way of example, as there may be a variety of ways to carry out the method described herein. Each block shown in FIG. 14 may further represent one or more processes, methods, or subroutines, and one or more of the blocks may include machine-readable instructions stored on a non-transitory computer-readable medium and executed by a processor or other type of processing circuit to perform one or more operations described herein.

Although the method 3000 is primarily described as being performed by system 100 as shown in FIGS. 12A-12B, the method 3000 may be executed or otherwise performed by other systems, or a combination of systems. It should be appreciated that, in some examples, to provide transacting of assets and/or associated non-fungible tokens (NFT), the method 3000 may incorporate artificial intelligence (AI) or deep learning techniques, as described above. It should also be appreciated that, in some examples, the method 3000 may be implemented in conjunction with a content platform (e.g., a social media platform) to generate and deliver content.

Reference is now made with respect to FIG. 14. At 3010, the processor 101 may modify an aspect of a security gateway to facilitate communication between a client device and a network device. In particular, and as described above, the processor 101 may modify one or more aspects of a security gateway to enable the security to operate as a metaverse security gateway (i.e., facilitate the metaverse). In some examples, the processor 101 may enable a non-access stratum layer (NAS) to be added to a protocol stack of the metaverse security gateway.

At 3020, in some examples, the processor 101 may modify an aspect of a network device to facilitate communication with a client device. In some examples, the processor 101 may implement one or more functional blocks associated with a trust model to simulate 3rd Generation Partnership Project (3GPP) core security, authentication, and communication practices to provide a metaverse server. Examples of these functional blocks may include Access Management Function (AMF), Security Anchor Function (SEAF), and Authentication Server Function (AUSF).

At 3030, in some examples, the processor 101 may enable communication between a client device and the network device to facilitate the metaverse. In one example, the client device may be a virtual reality (VR) headset, and the processor 101 may facilitate a metaverse communication associated with a network device maintained by the virtual reality (VR) headset provider.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
 a security gateway;
 a processor; and
 a memory storing instructions, which when executed by the processor, cause the processor to:
  modify the security gateway to provide a metaverse security gateway by implementing a first protocol and a second protocol in a protocol stack of the security gateway, wherein modifying the security gateway includes implementation of an internet protocol security (IPsec) tunnel utilizing a dynamic key and a universal subscriber identity module (USIM), wherein the first protocol is associated with a 3rd Generation Partnership Project (3GPP) standard, and wherein the second protocol is different than the first protocol; and
  utilize the metaverse security gateway to facilitate a metaverse communication for a first client device using the first protocol and a second client device using the second protocol.

2. The system of claim 1, wherein the second protocol is associated with Fast Identity Online (FIDO) authentication.

3. The system of claim 2, wherein modifying the security gateway further comprises assigning, via implementation of a security gateway (SecGW), a proxy subscriber identity module (SIM) to the first client device or the second client device.

4. The system of claim 1, wherein the instructions, when executed by the processor, further cause the processor to:
 facilitate a modification of an aspect of the second client device to utilize a Fast IDentity Online (FIDO) standard in association with the security gateway.

5. The system of claim 4, wherein the instructions, when executed by the processor, further cause the processor to:
 modify a server to provide a metaverse server by implementing the first protocol associated with the 3rd Generation Partnership Project (3GPP) standard.

6. The system of claim 5, wherein modifying the server comprises implementing at least one functional block associated with the 3rd Generation Partnership Project (3GPP) standard.

7. The system of claim 5, wherein modifying the server comprises implementing a Fast IDentity Online (FIDO) server within a 5G core (5GC) network.

8. The system of claim 7, wherein modifying the server further comprises assigning a proxy subscriber identity module (SIM), via the 5G core (5GC) network, to a client device.

9. A method, comprising:

modifying a security gateway to provide a metaverse security gateway by implementing a first protocol and a second protocol in a protocol stack of the security gateway, wherein modifying the security gateway includes implementation of an internet protocol security (IPsec) tunnel utilizing a dynamic key and a universal subscriber identity module (USIM), wherein the first protocol is associated with a 3rd Generation Partnership Project (3GPP) standard, and wherein the second protocol is different than the first protocol;

modifying a server to provide a metaverse server by implementing a third protocol associated with the 3rd Generation Partnership Project (3GPP) standard; and utilizing the metaverse security gateway and the metaverse server to facilitate a metaverse communication with a first device using the first protocol and a second device using the second protocol.

10. The method of claim 9, wherein modifying the server comprises implementing at least one functional block associated with the 3rd Generation Partnership Project (3GPP) standard.

11. The method of claim 9, wherein modifying the server comprises implementing a Fast IDentity Online (FIDO) server within a 5G core (5GC) network.

12. The method of claim 11, wherein modifying the server further comprises assigning a proxy subscriber identity module (SIM), via the 5G core (5GC) network, to a client device.

13. The method of claim 9, wherein modifying the security gateway comprises implementing a non-access stratum (NAS) layer in the protocol stack of the security gateway.

14. The method of claim 9, wherein the security gateway is to support 5G-capable devices and non-5G-capable devices.

15. A non-transitory computer-readable storage medium having an executable stored thereon, which when executed instructs a processor to:

modify a security gateway to provide a metaverse security gateway by implementing a first protocol and a second protocol in a protocol stack of the security gateway, wherein modifying the security gateway includes implementation of an internet protocol security (IPsec) tunnel utilizing a dynamic key and a universal subscriber identity module (USIM), wherein the first protocol is associated with a 3rd Generation Partnership Project (3GPP) standard, and wherein the second protocol is different than the first protocol;

modify a server to provide a metaverse server by implementing the first protocol associated with the 3rd Generation Partnership Project (3GPP) standard, wherein modifying the server comprises implementing at least one functional block associated with the 3rd Generation Partnership Project (3GPP) standard, the at least one functional block comprising Access Management function (AMF), Security Anchor function (SEAF), Authentication Server Function (AUSF), Authentication Credential Repository and Processing Function (ARPF) Unified Data Management (UDM), Security Edge Protection Proxy (SEPP), a User Plane Function (UPF) or a Session Management Function (SMF); and utilize the metaverse security gateway and the metaverse server to facilitate a metaverse communication for a first client device using the first protocol and a second client device using the second protocol.

16. The non-transitory computer-readable storage medium of claim 15, wherein modifying the server further comprises implementing a Fast IDentity Online (FIDO) standard on a dedicated server.

17. The non-transitory computer-readable storage medium of claim 16, wherein modifying the server further comprises assigning a proxy subscriber identity module (SIM), via implementation of the dedicated server, to the first client device.

18. The non-transitory computer-readable storage medium of claim 15, wherein modifying the security gateway comprises implementing a non-access stratum (NAS) layer in the protocol stack of the security gateway.

* * * * *